US012798552B2

(12) United States Patent
Yamaguchi et al.

(10) Patent No.: US 12,798,552 B2
(45) Date of Patent: Nov. 17, 2026

(54) ASSISTANCE SYSTEM FOR VEHICLE

(71) Applicant: SUBARU CORPORATION, Tokyo (JP)

(72) Inventors: Fumihito Yamaguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 282 days.

(21) Appl. No.: 18/853,758

(22) PCT Filed: Jul. 13, 2023

(86) PCT No.: PCT/JP2023/025887
§ 371 (c)(1),
(2) Date: Oct. 3, 2024

(87) PCT Pub. No.: WO2025/013284
PCT Pub. Date: Jan. 16, 2025

(65) Prior Publication Data
US 2026/0167175 A1 Jun. 18, 2026

(51) Int. Cl.
*B60W 30/02* (2012.01)

(52) U.S. Cl.
CPC ......... *B60W 30/02* (2013.01); *B60W 2556/50* (2020.02)

(58) Field of Classification Search
CPC ............. B60W 30/02; B60W 2556/50; B60W 2756/10; B60W 2556/45
USPC ......................................................... 370/254
See application file for complete search history.

(56) References Cited

U.S. PATENT DOCUMENTS

| | | | | |
|---|---|---|---|---|
| 2019/0239155 | A1 | 8/2019 | Ushida et al. | |
| 2020/0326701 | A1* | 10/2020 | Takechi | H04W 4/021 |
| 2024/0278787 | A1* | 8/2024 | Ogawa | B60W 40/02 |
| 2025/0328134 | A1* | 10/2025 | Kim | B60W 60/001 |

FOREIGN PATENT DOCUMENTS

| | | | |
|---|---|---|---|
| JP | 2018-018284 | A | 2/2018 |
| JP | 2021-179761 | A | 11/2021 |

OTHER PUBLICATIONS

International Search Report dated Sep. 5, 2023, from corresponding International Application No. PCT/JP2023/025887 (non-English).

* cited by examiner

*Primary Examiner* — Chi Tang P Cheng
*Assistant Examiner* — Michael Wayne Maddox
(74) *Attorney, Agent, or Firm* — Rimon P.C.

(57) ABSTRACT

In an assistance system for a vehicle, an automated driving server apparatus executes control for automated driving that: determines a traveling state of the vehicle, based on information received from the vehicle, generates information regarding automated driving travel control of the vehicle, and transmits the generated information to the vehicle; and relay control that transmits, to the service server apparatus, information regarding the vehicle including the information acquired from the vehicle. The service server apparatus generates information usable in a service for the vehicle using the information from the automated driving server apparatus without directly transmitting and receiving the information to and from the vehicle.

10 Claims, 16 Drawing Sheets

[ FIG. 1 ]
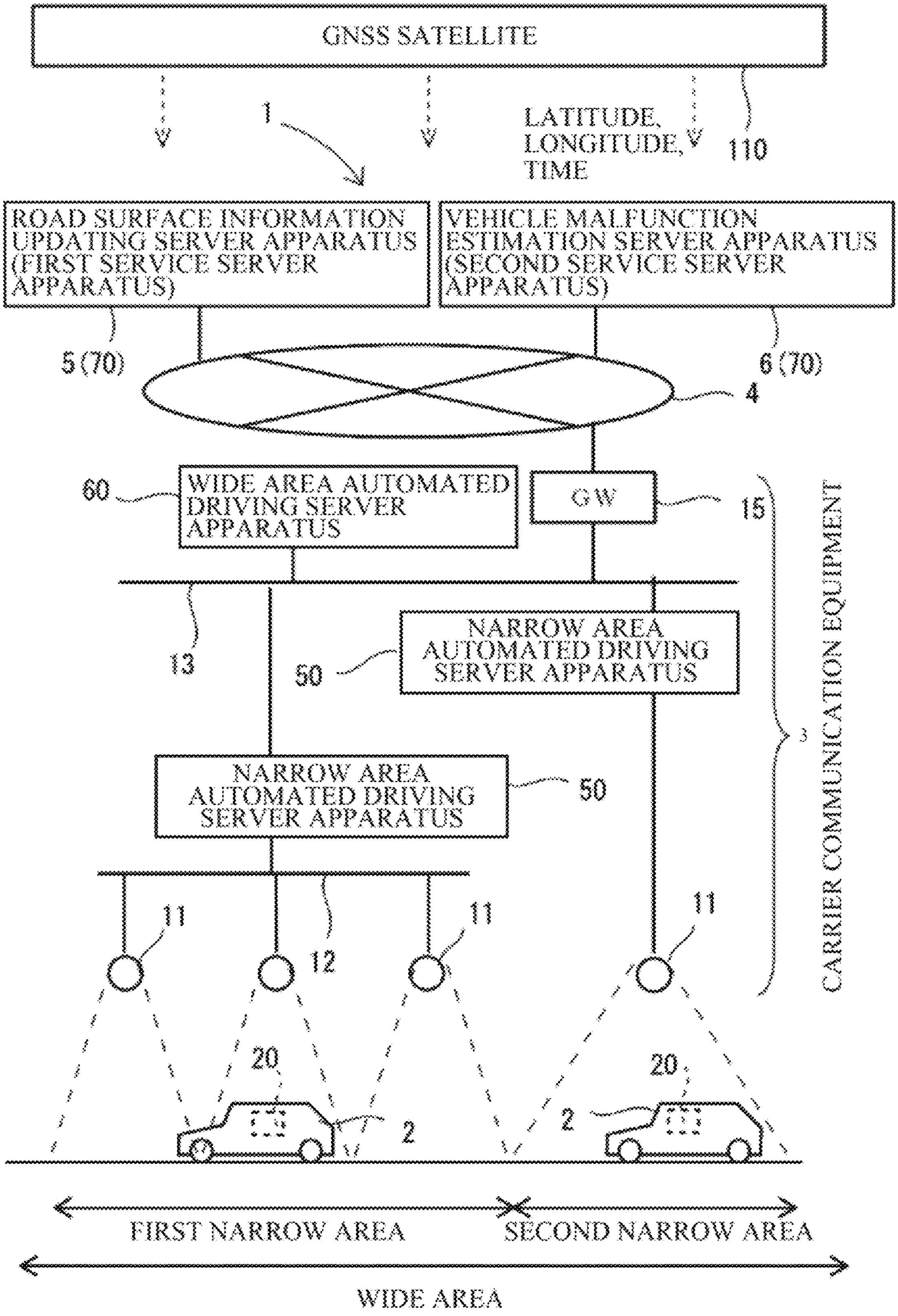

[ FIG. 2 ]
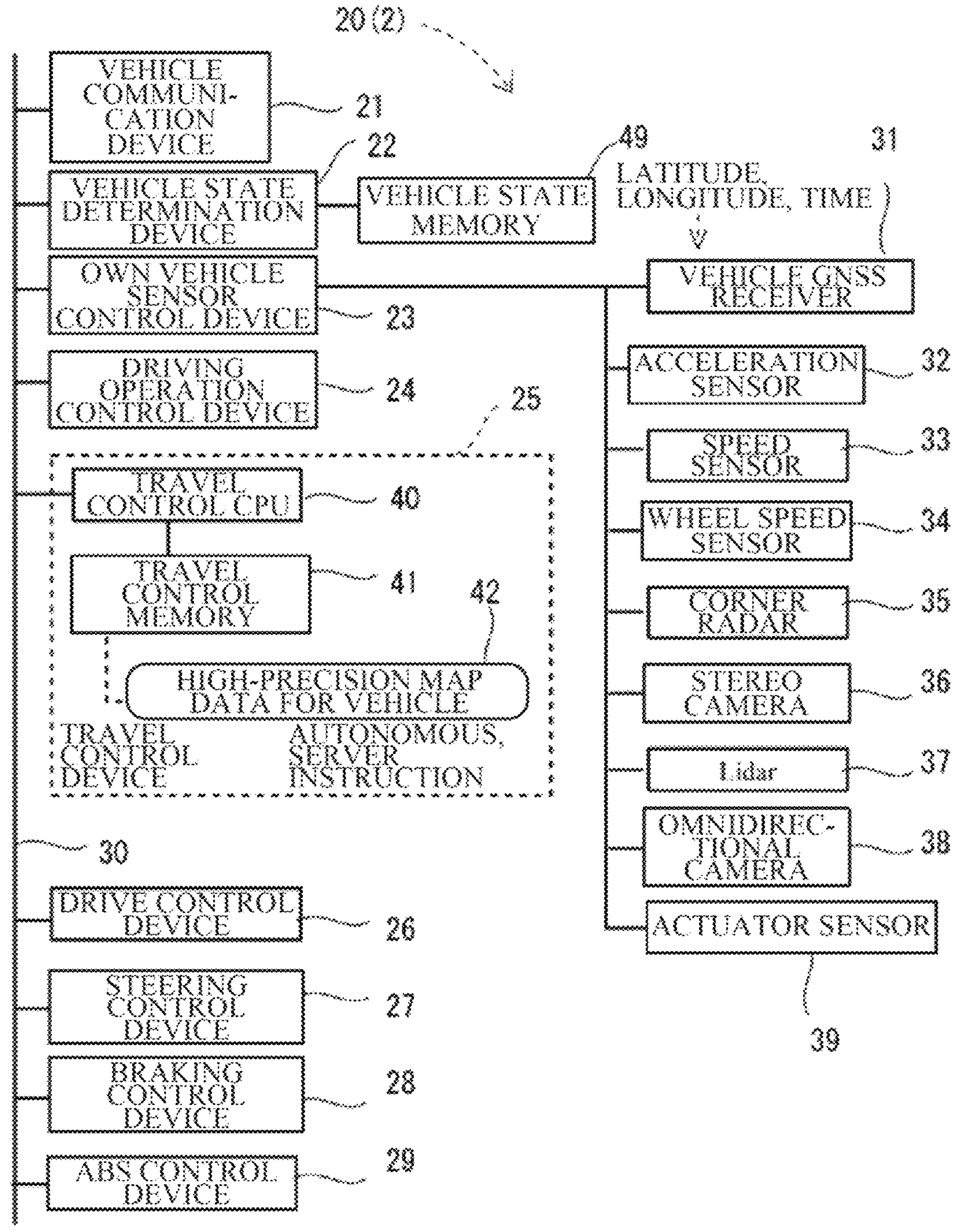

[ FIG. 3 ]
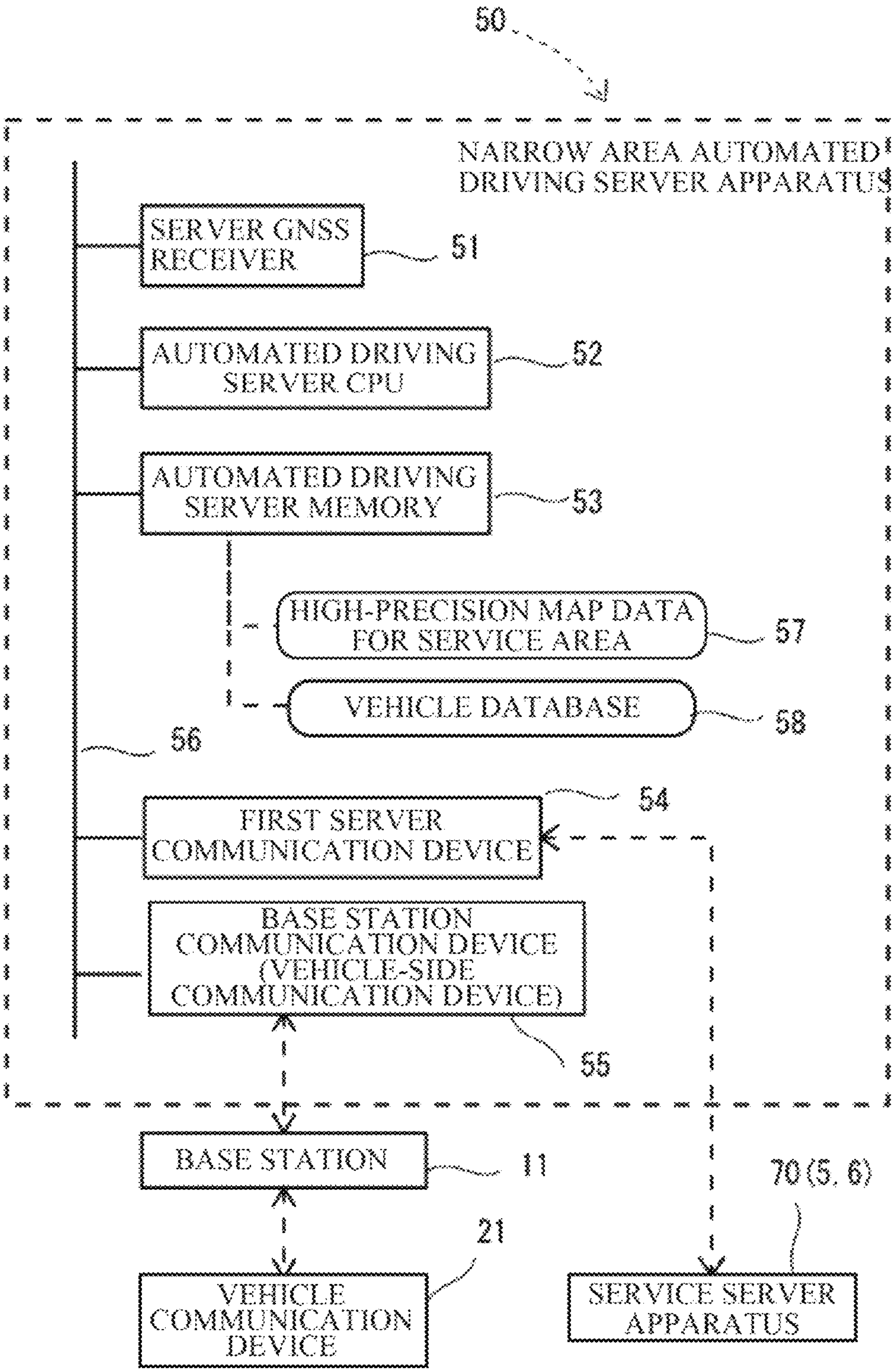

[ FIG. 4 ]
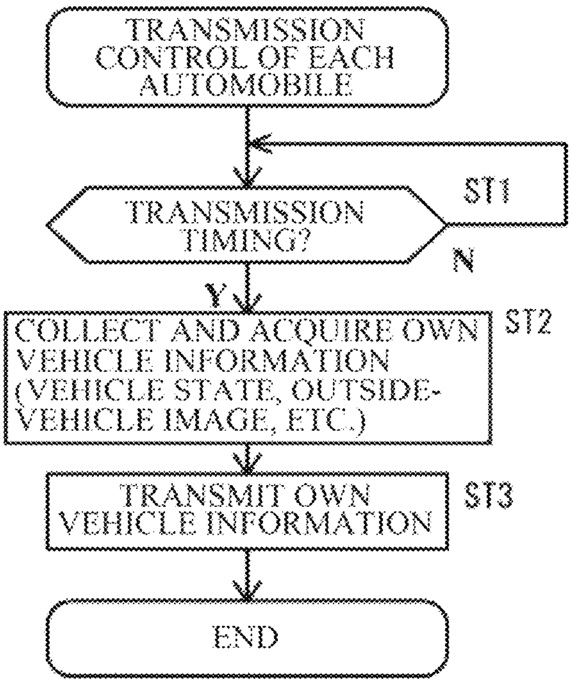
[ FIG. 5 ]
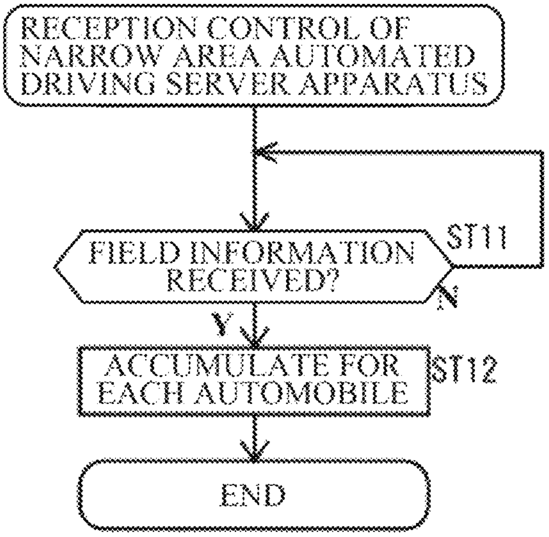

[ FIG. 6 ]
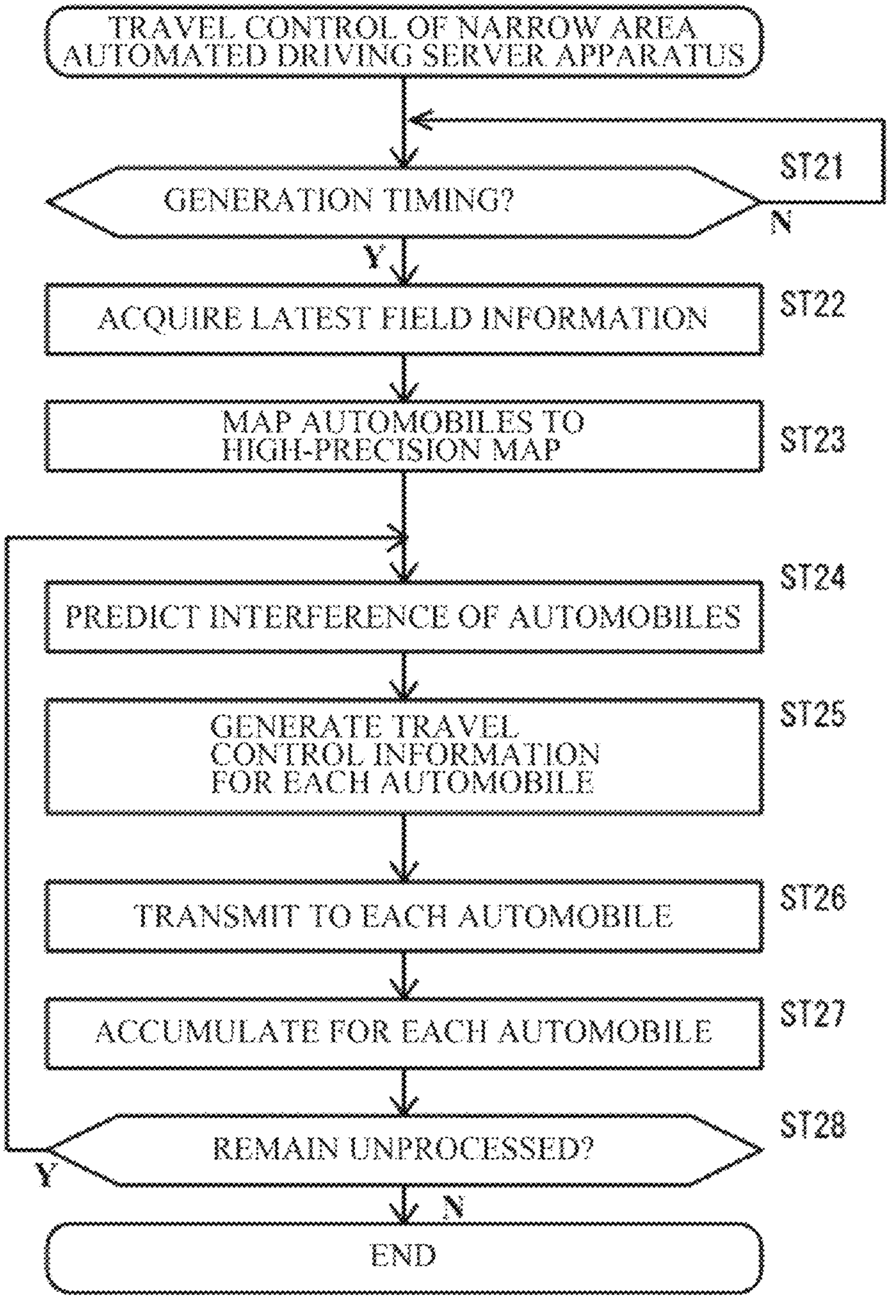

[ FIG. 7 ]
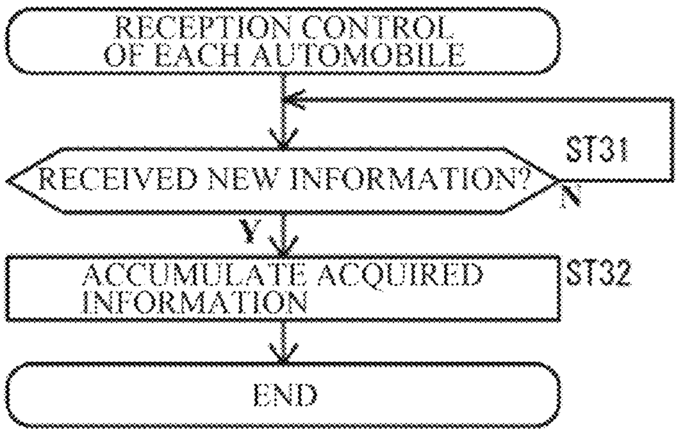
[ FIG. 8 ]
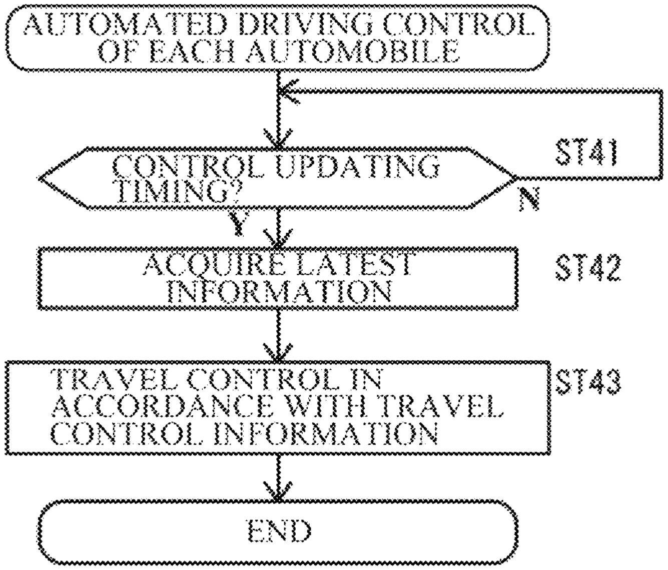

[ FIG. 9 ]
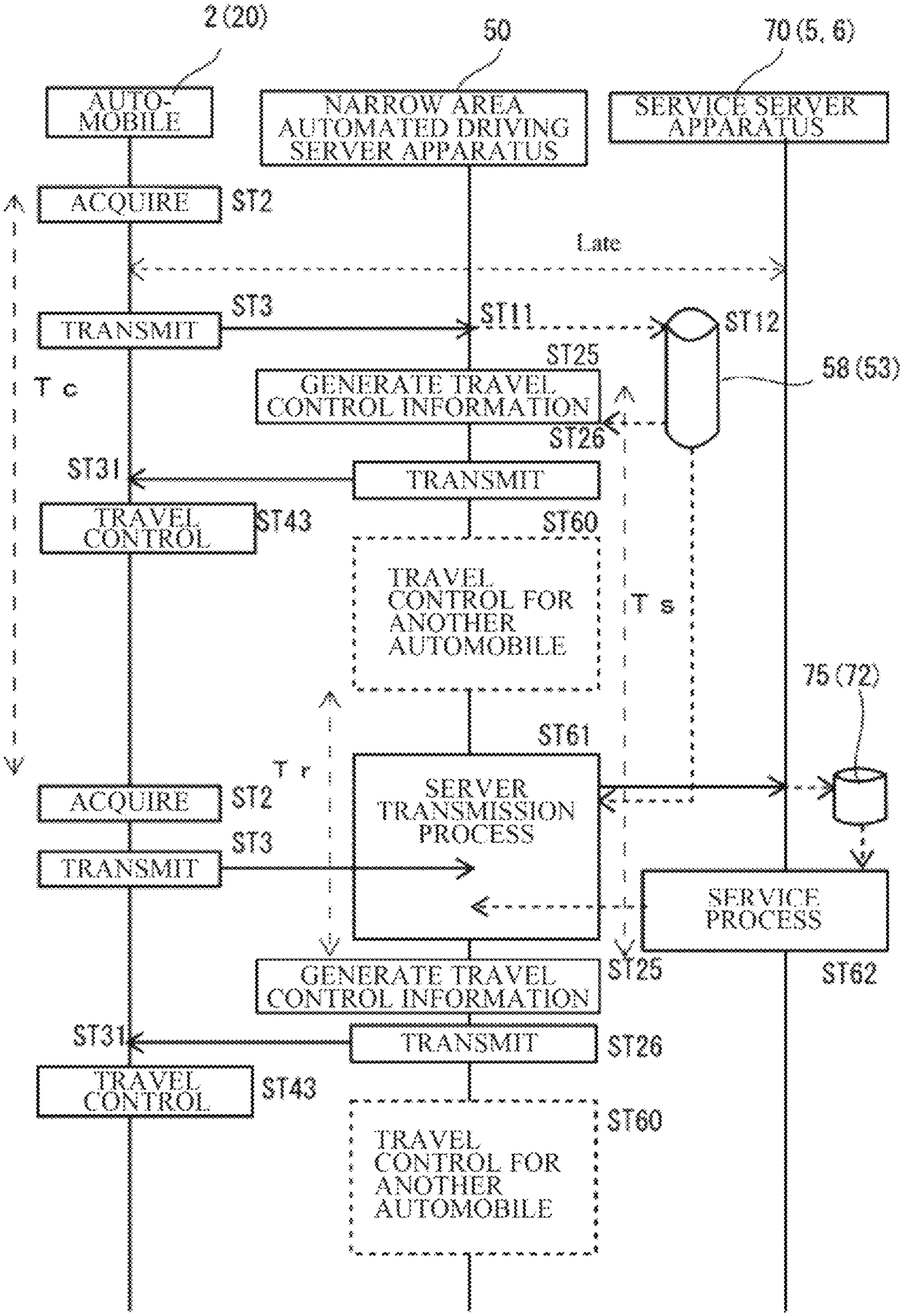

[ FIG. 10 ]
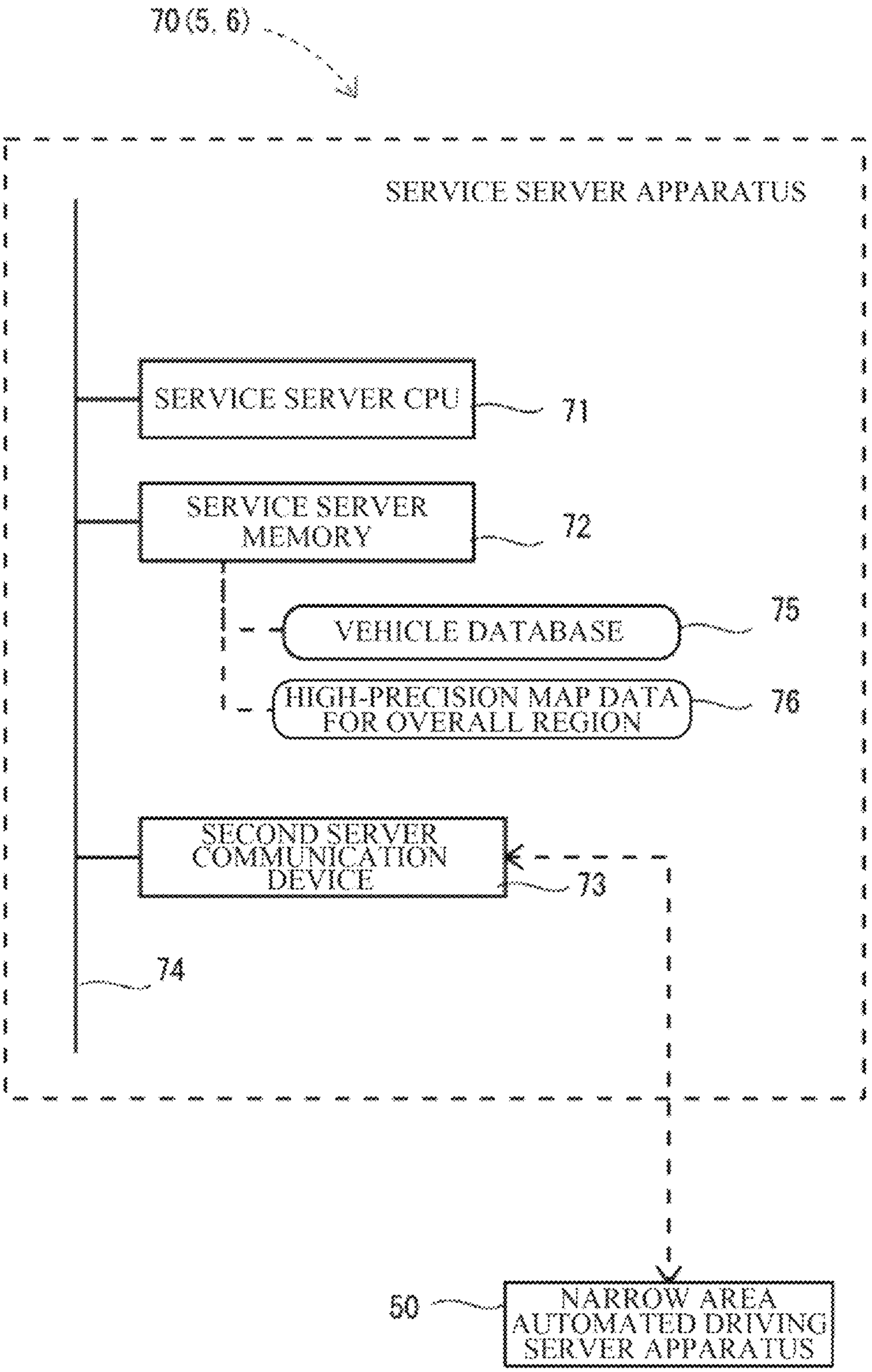

[ FIG. 11 ]
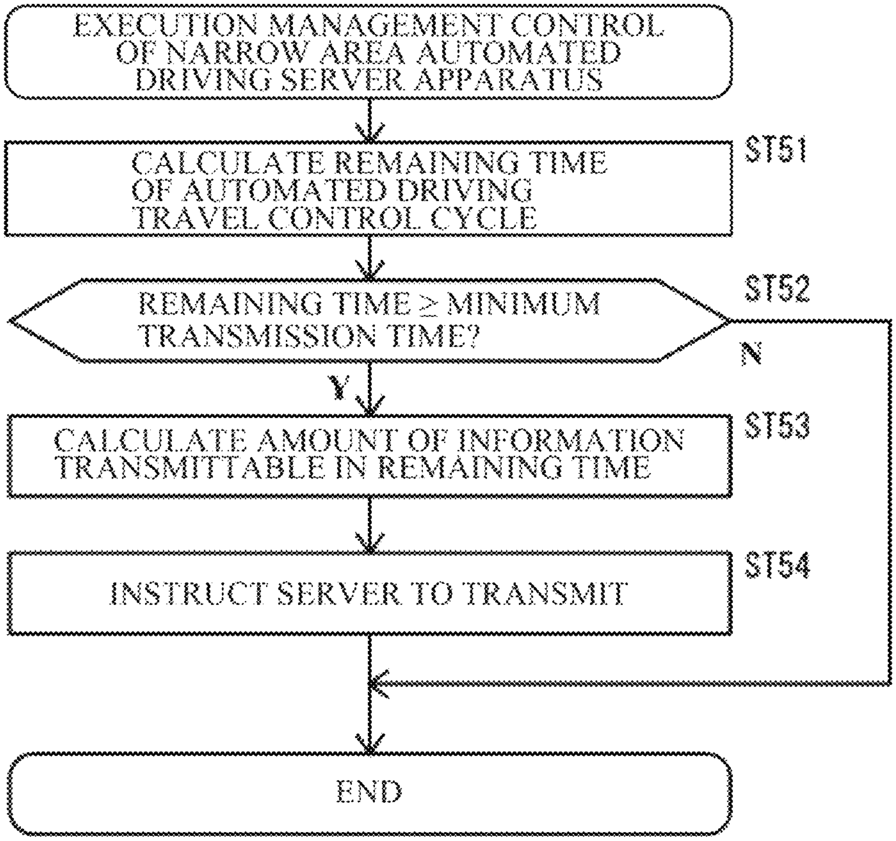

[ FIG. 12 ]
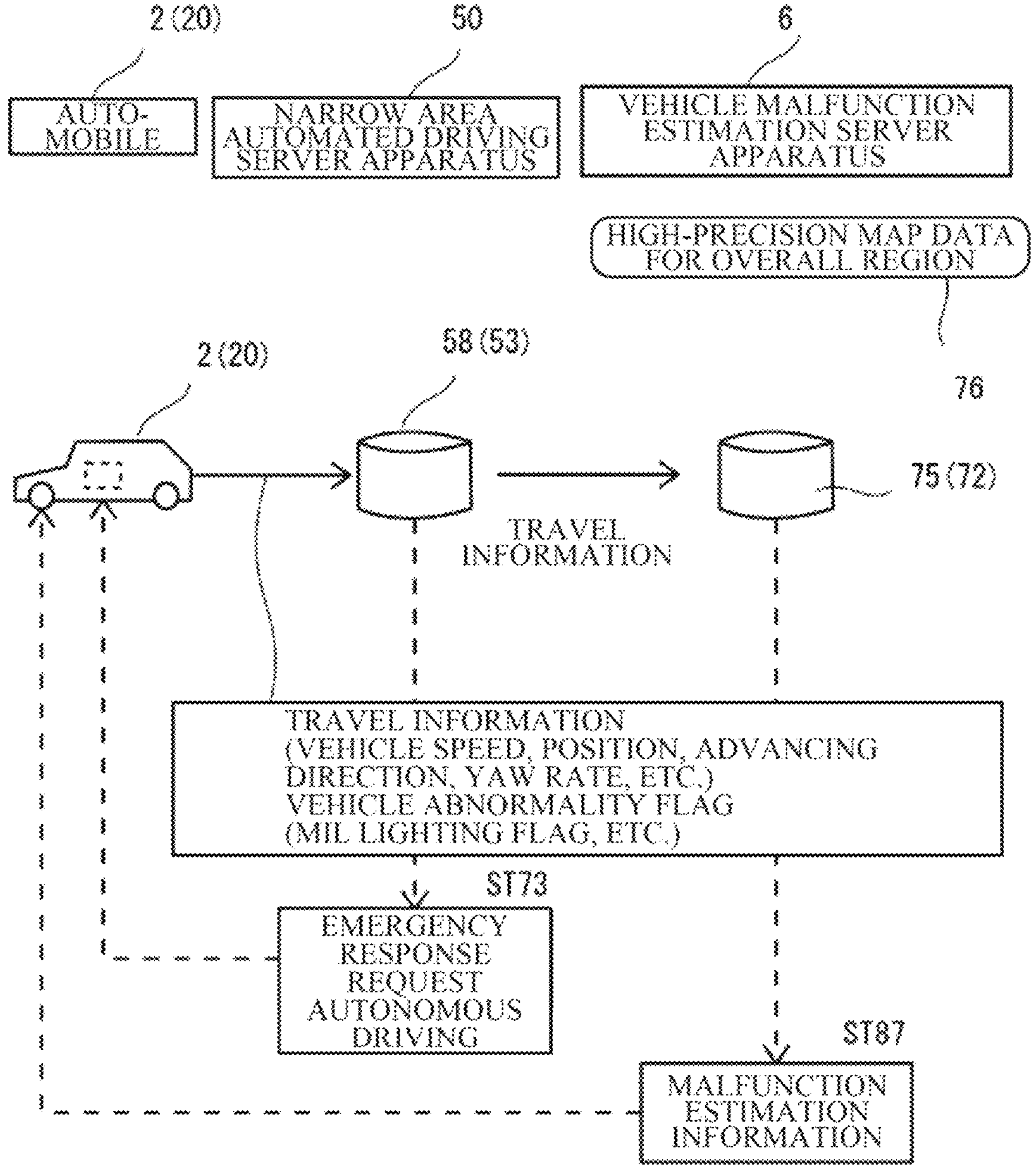

[ FIG. 13 ]
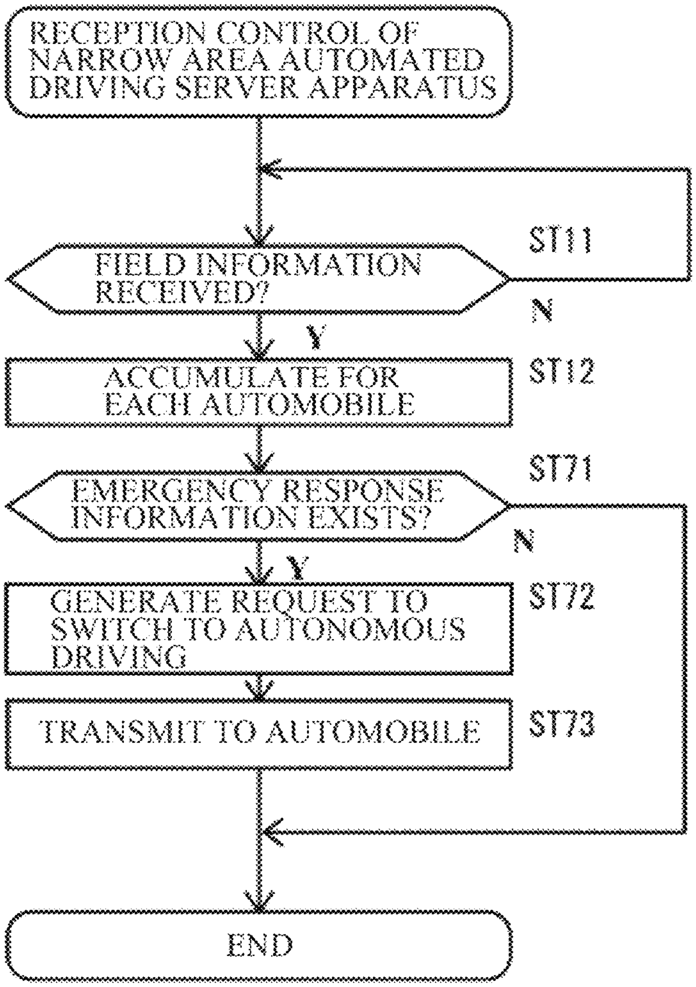

[ FIG. 14 ]
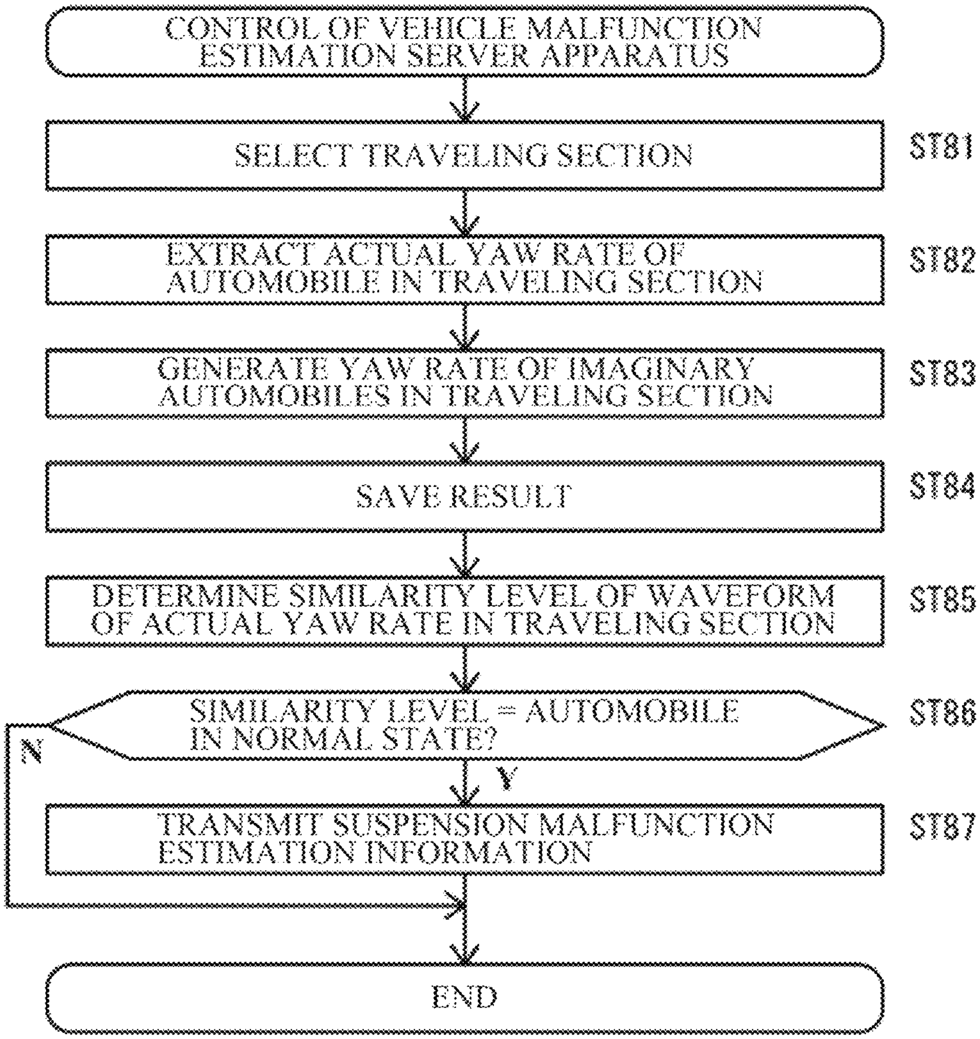

[ FIG. 15 ]
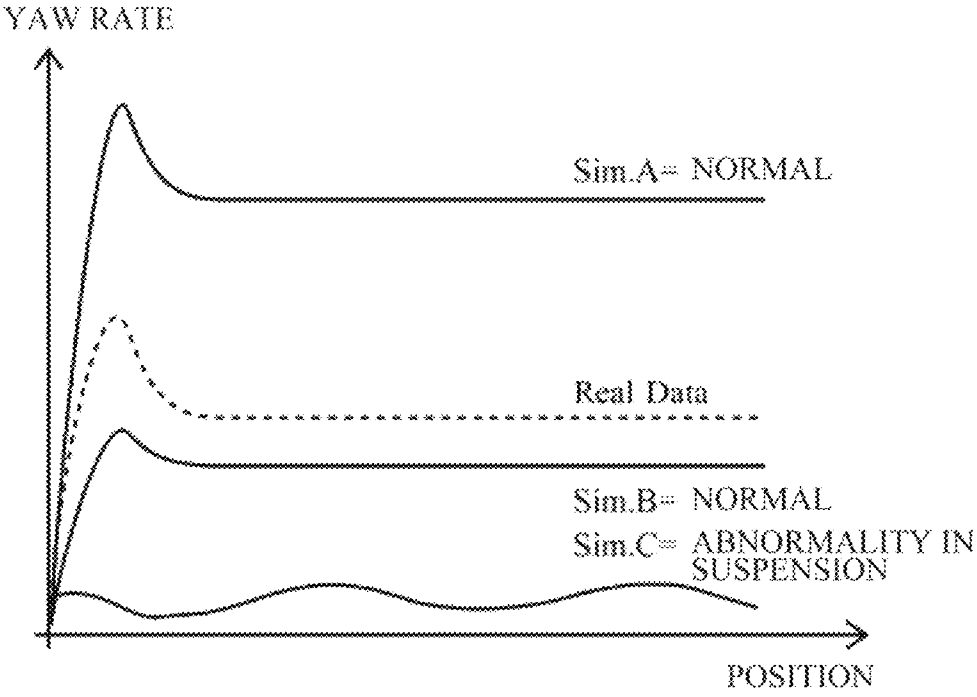
[ FIG. 16 ]
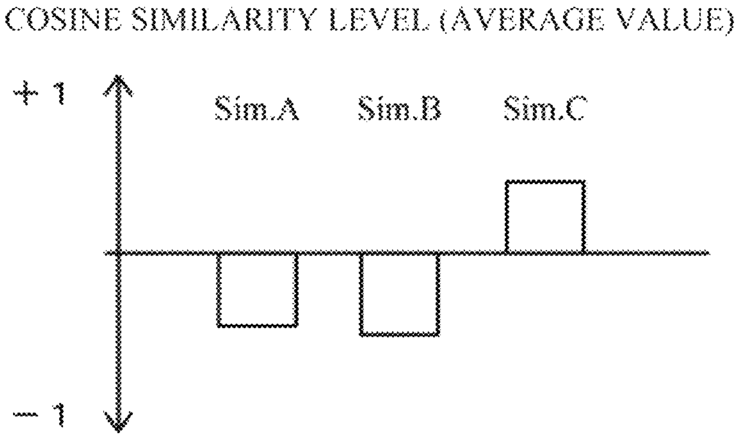

[ FIG. 17 ]
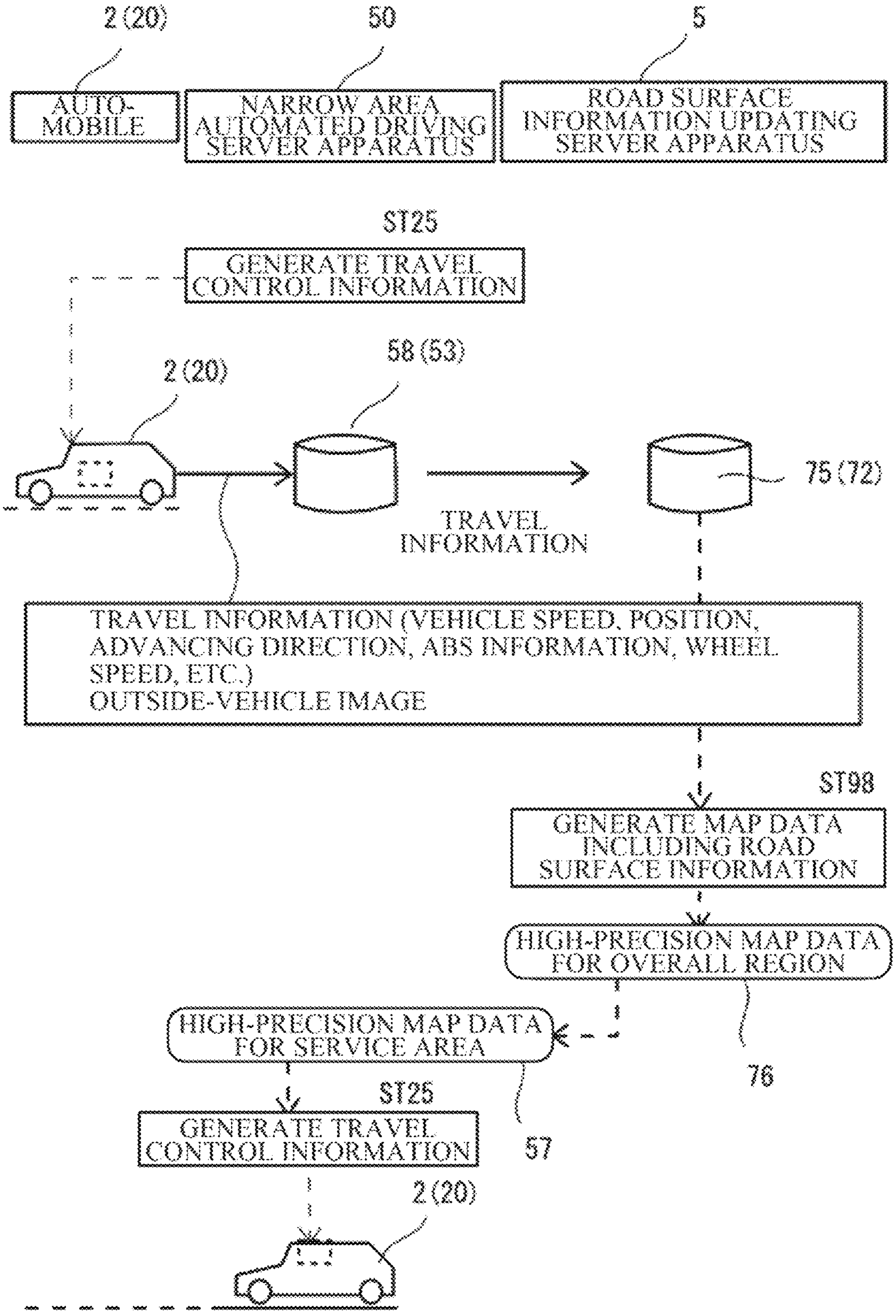

【FIG. 18】
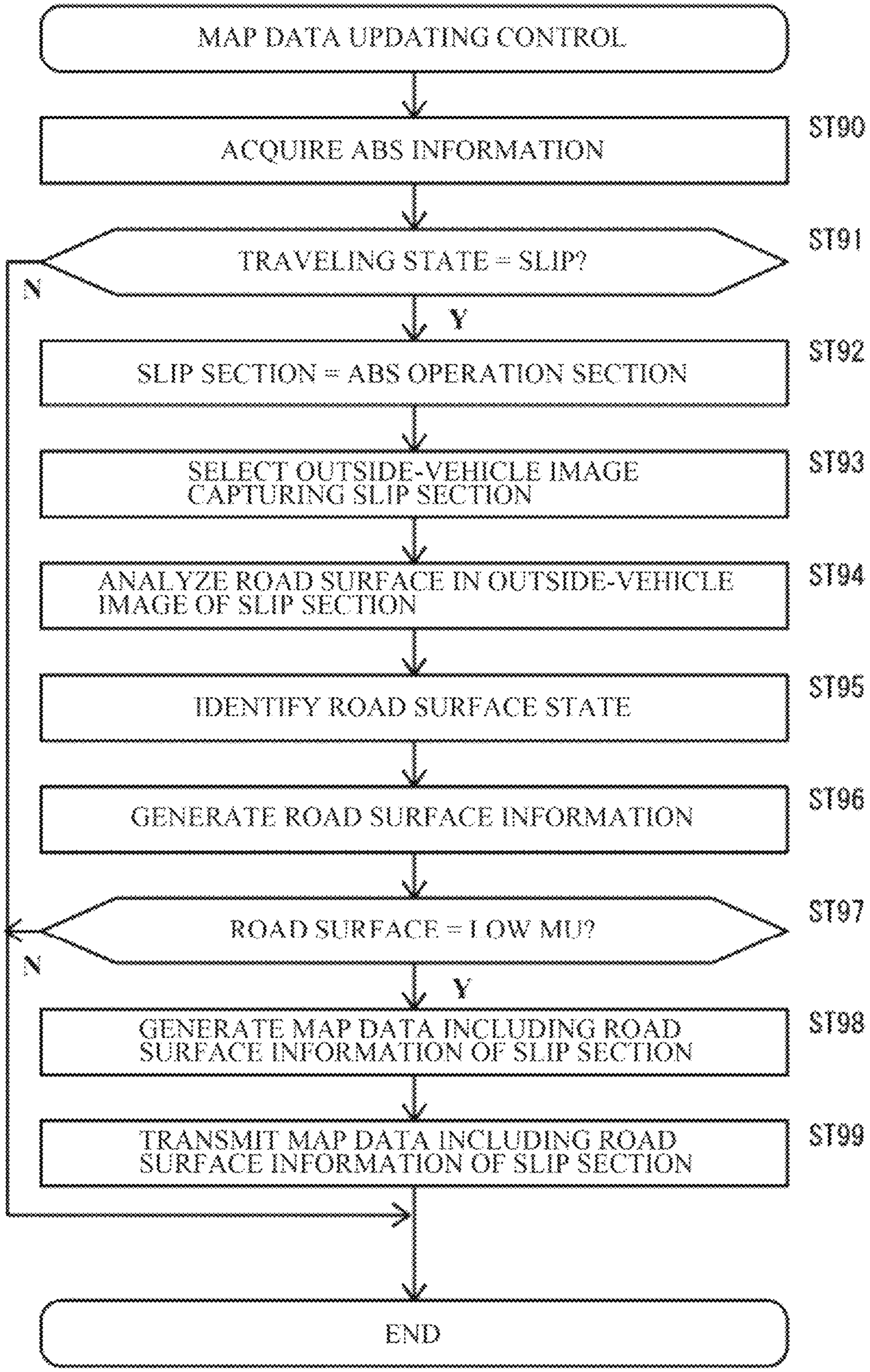

[ FIG. 19 ]
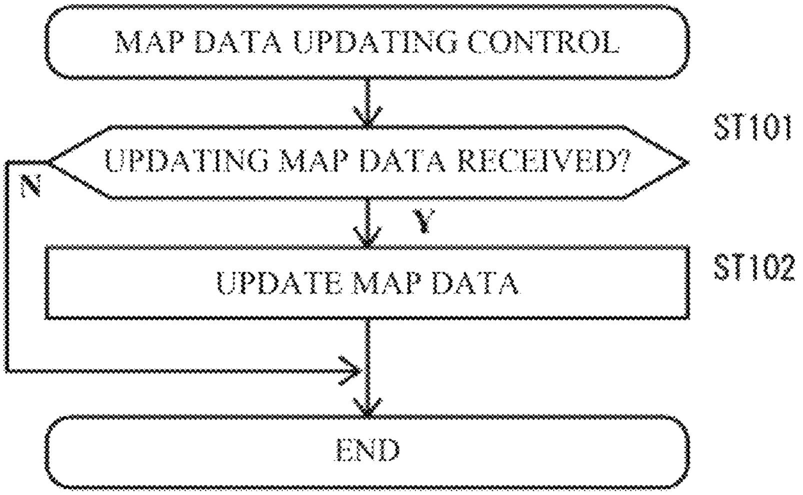
[ FIG. 20 ]
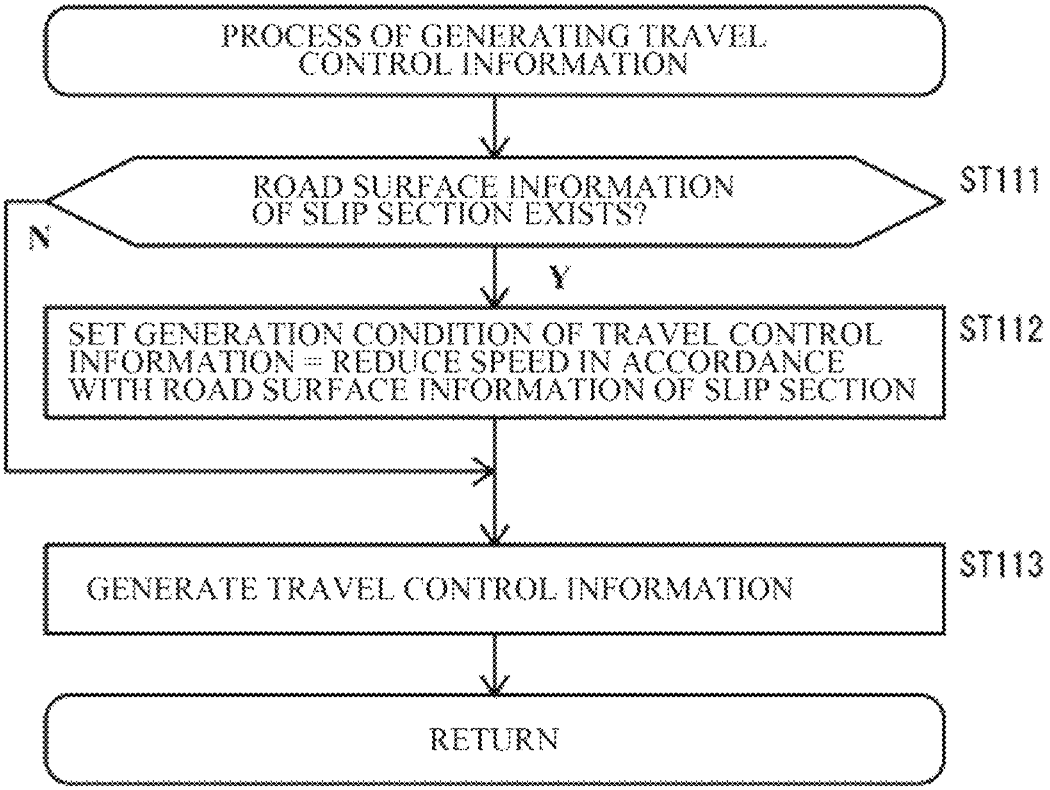

ASSISTANCE SYSTEM FOR VEHICLE

CROSS-REFERENCE TO RELATED APPLICATIONS

This application is the U.S. National Phase under 35 U.S.C. § 371 of International Application No. PCT/JP2023/025887, filed on Jul. 13, 2023, the entire contents of which are hereby incorporated by reference.

TECHNICAL FIELD

The invention relates to an assistance system for a vehicle.

BACKGROUND ART

In a vehicle such as an automobile, research and development for controlling traveling of the vehicle by automated driving through a server apparatus have been advanced (Patent Literatures 1 and 2).

Additionally, in the vehicle, research and development have also been advanced on providing the vehicle with various kinds of services through communication with the server apparatus and providing, for example, information for infotainment from the server apparatus.

CITATION LIST

Patent Literature

Patent Literature 1: Japanese Unexamined Patent Application Publication No. 2021-179761

Patent Literature 2: Japanese Unexamined Patent Application Publication No. 2018-018284

SUMMARY OF INVENTION

Problem to be Solved by the Invention

For example, a vehicle whose traveling in automated driving is controlled by a server apparatus is to transmit information regarding a traveling state of an own vehicle to the server apparatus and to receive information regarding automated driving travel control of the own vehicle from the server apparatus. Moreover, it is considered that the transmission and the reception between the vehicle and the server apparatus for the automated driving travel control are to be repeatedly executed in a cycle within at least several hundred milliseconds because a travel environment of the vehicle during traveling changes every moment. In the vehicle in such a high-load communication state, when information for a service other than the automated driving travel control is communicated to and from, for example, a second server apparatus different from the server apparatus for the automated driving travel control additionally, a communication load on the vehicle is predicted to become extremely large. In this case, there is an increased possibility that it becomes difficult for the vehicle to continue to appropriately perform communication for the automated driving travel control. In other words, when the second server apparatus directly communicates with the vehicle, there is an increased possibility of hindering the communication between the server apparatus for the automated driving travel control and the vehicle. The more the number of services provided to the vehicle is increased, the more likely it is that the communication between the server apparatus for the automated driving travel control and the vehicle is hindered.

As described above, in the assistance system for a vehicle that intends to provide the vehicle with multiple services including the automated driving travel control, it is desired to make it possible to provide the vehicle with a service other than the automated driving travel control while reducing the communication load on the vehicle and thus making it difficult to hinder the communication for the automated driving travel control.

Means for Solving the Problem

An aspect of the invention provides an assistance system for a vehicle. The assistance system includes an automated driving server apparatus and a service server apparatus. The automated driving server apparatus is adapted for automated driving travel control. The automated driving server apparatus is configured to repeatedly transmit and receive information to and from the vehicle. The service server apparatus is configured to transmit and receive information regarding the vehicle to and from the automated driving server apparatus. The automated driving server apparatus includes a vehicle-side communication device to be used for communication with the vehicle, a first server communication device to be used for communication with the service server apparatus, an automated driving server memory, and an automated driving controller. The automated driving controller of the automated driving server apparatus is configured to record, in the automated driving server memory, information acquired by the vehicle-side communication device repeatedly receiving from the vehicle. The automated driving controller of the automated driving server apparatus is configured to execute: control for automated driving that determines a traveling state of the vehicle, based on information acquired by the vehicle-side communication device repeatedly receiving from the vehicle, generates information regarding the automated driving travel control, and repeatedly transmits the generated information through the vehicle-side communication device to the vehicle; and relay control that acquires, from the automated driving server memory, the information regarding the vehicle including the information acquired from the vehicle, and transmits the acquired information through the first server communication device to the service server apparatus. The service server apparatus includes a second server communication device to be used for communication with the automated driving server apparatus, and a service controller. The service controller of the service server apparatus is configured to generate information usable in a service for the vehicle, using the information regarding the vehicle acquired by transmission and reception to and from the automated driving server apparatus through the second server communication device without directly transmitting and receiving the information to and from the vehicle.

Effects of the Invention

The assistance system for the vehicle according to the invention includes the service server apparatus in addition to the automated driving server apparatus for the automated driving travel control of the vehicle. The service server apparatus does not directly transmit and receive information to and from the vehicle, but transmits and receives information regarding the vehicle to and from the automated driving server apparatus. On this occasion, the automated driving server apparatus transmits the information regarding the vehicle including the information acquired from the vehicle to the service server apparatus on behalf of the vehicle. To achieve the above, the automated driving server apparatus records the information acquired from the vehicle in the automated driving server memory, and transmits the information acquired from the automated driving server memory to the service server apparatus.

Thus, the service server apparatus generates information usable in the service for the vehicle using the information regarding the vehicle acquired through transmission and reception to and from the automated driving server apparatus without directly transmitting and receiving the information to and from the vehicle.

This makes it possible for the assistance system for the vehicle according to the invention to generate, in the service server apparatus, information usable in the service for the vehicle, which is useful for traveling of the vehicle, without excessively increasing the communication load between the vehicle and the automated driving server apparatus to allow communication repeatedly with a small delay.

In contrast, for example, if the service server apparatus directly transmits and receives information to and from the vehicle separately from the automated driving server apparatus, there is an increased possibility that the communication between the service server apparatus and the vehicle hinders the communication between the vehicle and the automated driving server apparatus. According to the invention, it is possible to generate, in the service server apparatus, and provide information useful for the vehicle that is difficult to be provided by the automated driving server apparatus, without causing such an increase in the communication load on the vehicle that may possibly hinder the automated driving travel control. Moreover, in the invention, it is expected that the vehicle continues appropriately executing the communication for the automated driving travel control. The invention makes it possible to improve the service for the vehicle.

As described above, the assistance system for the vehicle according to the invention makes it possible to provide the vehicle with a service other than the automated driving travel control while reducing the communication load on the vehicle and thus making it difficult to hinder the communication for the automated driving travel control. The assistance system for the vehicle according to the invention makes it possible to provide the vehicle with multiple services including the automated driving travel control without hindering the automated driving travel control. Even if the number of services for the vehicle is increased, the invention makes it difficult to hinder the communication between the server apparatus for the automated driving travel control and the vehicle.

BRIEF DESCRIPTION OF DRAWINGS

FIG. 1 is a configuration diagram of an assistance system for an automobile according to a first embodiment of the invention.

FIG. 2 is a main configuration diagram of a control system of the automobile illustrated in FIG. 1.

FIG. 3 is a main configuration diagram of a narrow area automated driving server apparatus illustrated in FIG. 1.

FIG. 4 is a flowchart of transmission control of each automobile executed by the control system of the automobile illustrated in FIG. 2.

FIG. 5 is a flowchart of reception control executed by the narrow area automated driving server apparatus illustrated in FIG. 1.

FIG. 6 is a flowchart of travel control of multiple automobiles executed by the narrow area automated driving server apparatus illustrated in FIG. 1.

FIG. 7 is a flowchart of reception control of each automobile executed by the control system of the automobile illustrated in FIG. 2.

FIG. 8 is a flowchart of automated driving control of each automobile executed by the control system of the automobile illustrated in FIG. 2.

FIG. 9 is a timing chart of travel control for multiple automobiles in the assistance system illustrated in FIG. 1.

FIG. 10 is a main configuration diagram of a service server apparatus illustrated in FIG. 1.

FIG. 11 is a flowchart of execution management control in the server apparatus executed by the narrow area automated driving server apparatus illustrated in FIG. 1.

FIG. 12 is an explanatory diagram of communication information for dealing with a malfunction in the automobile in an assistance system for an automobile according to a second embodiment of the invention.

FIG. 13 is a flowchart of reception control executed by the narrow area automated driving server apparatus according to the present embodiment.

FIG. 14 is a flowchart of malfunction estimation control executed by a vehicle malfunction estimation server apparatus.

FIG. 15 is a graph illustrating waveforms of yaw rates corresponding to traveling positions of multiple automobiles including an automobile whose traveling is controlled by the assistance system.

FIG. 16 is a graph illustrating similarity levels of the waveforms of the yaw rates illustrated in FIG. 15 between the waveform of the automobile whose traveling is controlled by the assistance system and the waveforms of other automobiles.

FIG. 17 is an explanatory diagram of communication information for updating road surface information in an assistance system for an automobile according to a third embodiment of the invention.

FIG. 18 is a flowchart of control executed by a road surface information updating server apparatus illustrated in FIG. 17 to update map data, based on slippery road surface information.

FIG. 19 is a flowchart of map data updating control executed by the narrow area automated driving server apparatus in response to the control of the road surface information updating server apparatus illustrated in FIG. 18.

FIG. 20 is a flowchart of a process of generating travel control information for the automobile corresponding to updating of the map data and executed by the narrow area automated driving server apparatus in step ST25 of FIG. 6.

MODE FOR CARRYING OUT THE INVENTION

Hereinafter, embodiments of the invention will be described based on the drawings.

First Embodiment

FIG. 1 is a configuration diagram of an assistance system 1 for an automobile 2 according to a first embodiment of the invention. The assistance system 1 for the automobile 2 in FIG. 1 assists automated driving of the automobile 2 and provides a service other than the automated driving for the automobile 2.

FIG. 1 illustrates multiple automobiles 2 that are configured to travel by automated driving performed by the assistance system 1. The automobiles 2 are traveling on a road. Multiple base stations 11 of carrier communication equipment 3 are located along the road. There are also multiple GNSS (Global Navigation Satellite System) satellites 110 in the sky above the ground. The GNSS satellites 110 transmit information including their position and a time. By receiving electric waves of the GNSS satellites 110, it is possible for the automobiles 2 or the like to obtain information including their position and a time.

The assistance system 1 of FIG. 1 includes multiple narrow area automated driving server apparatuses 50, a wide area automated driving server apparatus 60, a road surface information updating server apparatus 5 as a first service server apparatus 70, and a vehicle malfunction estimation server apparatus 6 as a second service server apparatus 70 to provide the automobiles 2 with multiple services including the automated driving. The narrow area automated driving server apparatuses 50 and the wide area automated driving server apparatus 60 basically assist the automated driving of the automobiles 2. The road surface information updating server apparatus 5 and the vehicle malfunction estimation server apparatus 6 are service server apparatuses 70 that provide the automobiles 2 with services other than the automated driving.

Each of the narrow area automated driving server apparatuses 50 is provided per zone in which one or multiple base stations 11 of the carrier communication equipment 3 are communicable, within a region where the assistance system 1 provides an automated driving service. The narrow area automated driving server apparatuses 50 may each be coupled to a local communication network 12 of the carrier communication equipment 3 coupled to the base stations 11, or may be directly coupled to the corresponding base station 11. The narrow area automated driving server apparatuses 50 may be provided as equipment integrated with the base station 11.

The carrier communication equipment 3 includes, for example, various kinds of gateway devices 15 and a carrier wide area communication network 13 in addition to the base stations 11 and the local communication network 12 described above. The local communication network 12 and the carrier wide area communication network 13 constitute the carrier communication networks 12 and 13.

The carrier wide area communication network 13 may be provided as multiple divided networks or may be provided as one network for a region in which a carrier provides a service. The local communication network 12 and the base stations 11 may be coupled to the carrier wide area communication network 13 through a non-illustrated gateway device. Further, the carrier wide area communication network 13 may be coupled to an Internet 4 through the gateway devices 15. As described above, the carrier communication equipment 3 may be provided in a flexible configuration in accordance with actual circumstances of the region to lay it. The carrier communication equipment 3 does not include the Internet 4 therein. It is therefore possible for various kinds of server apparatuses provided in the carrier communication equipment 3 to perform high-speed communication with each other in a broadband inside the carrier communication equipment 3.

The wide area automated driving server apparatus 60 is coupled to, for example, the carrier wide area communication network 13 in the carrier communication equipment 3. The wide area automated driving server apparatus 60, together with the narrow area automated driving server apparatuses 50, provides the automated driving service by remote control or traffic control to the automobiles 2 traveling in the region where the carrier communication equipment 3 is laid. Note that, however, in the following, to simplify the description, an example will be described in which the automated driving service by remote control or traffic control is provided to the automobiles 2 only by the narrow area automated driving server apparatuses 50 out of the wide area automated driving server apparatus 60 and the narrow area automated driving server apparatuses 50. The various kinds of control described below may be shared by the wide area automated driving server apparatus 60 and the narrow area automated driving server apparatuses 50 in accordance with the respective processing loads and the respective processing capabilities. Even in this case, because both the wide area automated driving server apparatus 60 and the narrow area automated driving server apparatuses 50 are coupled to the network of the carrier communication equipment 3, it is possible to perform the high-speed communication with each other in a broadband and to make it difficult to cause, for example, a delay in processing.

As described above, the wide area automated driving server apparatus 60 and the narrow area automated driving server apparatuses 50 are provided to be communicable with the base stations 11 that wirelessly communicate with the automobiles 2, with a small delay. This makes it possible for the wide area automated driving server apparatus 60 and the narrow area automated driving server apparatuses 50 to repeatedly transmit and receive, for example, information for the automated driving to and from the automobiles 2 that are traveling.

The road surface information updating server apparatus 5 and the vehicle malfunction estimation server apparatus 6 provide services other than the automated driving of the automobile 2. The road surface information updating server apparatus 5 and the vehicle malfunction estimation server apparatus 6 are coupled to the Internet 4. When communicating with, for example, the automobiles 2 and the narrow area automated driving server apparatuses 50, these service server apparatuses 70 are to communicate through the Internet 4 and the network of the carrier communication equipment 3. Such communication is delayed in information compared with the communication through only the network of the carrier communication equipment 3.

The road surface information updating server apparatus 5 updates high-precision map data to be used for the automated driving, based on information collected from the automobiles 2. This makes it possible for the automobiles 2 traveling by the automated driving under the assistance system 1 to travel under the high-precision map data updated by the latest information collected from the automobiles 2. It is expected that traveling safety of the automobiles 2 traveling by the automated driving under the assistance system 1 is enhanced. The road surface information updating server apparatus 5 provides a service that enhances the safety of the automobiles 2.

The vehicle malfunction estimation server apparatus 6 estimates a malfunction in the automobiles 2 traveling by the automated driving under the assistance system 1. Thus, when a malfunction occurs in, for example, a suspension of any automobile 2 traveling by the automated driving under the assistance system 1, it is possible to provide malfunction estimation information to the automobile 2. It is expected that the traveling safety of the automobiles 2 traveling by the automated driving under the assistance system 1 is enhanced. The vehicle malfunction estimation server apparatus 6 provides a service that enhances the safety of the automobiles 2.

Note that the assistance system 1 for the automobile 2 may provide services other than those described above from a server apparatus coupled to the Internet 4. Examples of such services include an infotainment service for the automobiles 2, an entertainment service in the automobiles 2, and a monitoring service for the automobiles 2. It is desirable that the assistance system 1 for the automobile 2 make it possible to provide multiple services to each automobile 2 at the same time.

As described above, in the assistance system 1 of FIG. 1, the wide area automated driving server apparatus 60 and the narrow area automated driving server apparatuses 50 for the automated driving of the automobiles 2 are directly coupled to the carrier communication networks 12 and 13 of the carrier communication equipment 3. Thus, the wide area automated driving server apparatus 60 and the narrow area automated driving server apparatuses 50 may repeatedly transmit and receive information to and from the automobiles 2 in a relatively short cycle. The wide area automated driving server apparatus 60 and the narrow area automated driving server apparatuses 50 are usable as an automated driving server apparatus adapted to continuously perform the automated driving travel control of the automobile 2 for multiple automobiles 2.

In contrast, the various kinds of service server apparatuses 70 for services other than the automated driving, such as the road surface information updating server apparatus 5 and the vehicle malfunction estimation server apparatus 6, are coupled to the carrier communication networks 12 and 13 through the Internet 4. This makes it possible to reduce the server apparatuses directly coupled to the carrier communication networks 12 and 13 of the carrier communication equipment 3.

However, even if the various kinds of service server apparatuses 70 for services other than the automated driving are coupled to the Internet 4 not to be directly coupled to the carrier communication networks 12 and 13 as described above, there are problems as follows.

In other words, each service server apparatus 70 is to transmit and receive information to and from each automobile 2 to execute a service for each automobile 2. When the number of services provided by the assistance system 1 is increased, multiple server apparatuses for respective services are to transmit and receive information to and from each automobile 2 to provide the respective services to each automobile 2. As a result, each automobile 2 is to perform communication with multiple server apparatuses for multiple services to be used in addition to the communication with the server apparatuses for the automated driving. This increases the possibility that each automobile 2 is unable to withstand communication of such a large amount of information. In particular, when the various kinds of service server apparatuses 70 for services other than the automated driving are coupled to the Internet 4, the propagation of information between the service server apparatuses 70 and the automobiles 2 is slow. This increases the possibility that each automobile 2 is unable to withstand such communication of information with many delays.

Moreover, it is possible for the automobile 2 to perform the automated driving under the assistance system 1 by repeatedly transmitting and receiving the information for the automated driving to and from the server apparatuses of the assistance system 1 in a relatively short cycle. In this case, each automobile 2 is to prevent the communication with the various kinds of service server apparatuses 70 for services other than the automated driving from affecting the transmission and the reception of the information for the automated driving to and from the server apparatuses of the assistance system 1 in a relatively short cycle. Even if the wireless communication between the base stations 11 and the automobiles 2 is of the fifth generation, it is unlikely that this may be compensated for regarding all the automobiles 2. Further, when the communication of services for the automobiles 2 via the Internet 4 increases in addition to the high-speed communication for the automated driving of the automobiles 2 in the carrier communication networks 12 and 13, there is a possibility that an issue of congestion becomes significant in the carrier communication networks 12 and 13 themselves.

As described above, when another service is to be provided to the automobiles 2 whose traveling in the automated driving is controlled by the server apparatuses of the assistance system 1, there is a possibility that simply coupling a server apparatus for the other service to the Internet 4 may be insufficient to maintain the quality of the automated driving.

For example, it is considered that the transmission and the reception between the automobiles 2 and the server apparatuses for the automated driving travel control are to be repeatedly executed in a cycle within at least several hundred milliseconds because a travel environment of the automobiles 2 during traveling changes every moment. In the automobiles 2 in such a relatively high-load communication state, when the information for the service other than the automated driving travel control is directly communicated to and from, for example, the service server apparatus 70 different from the server apparatuses for the automated driving travel control additionally, a communication load on the automobiles 2 is predicted to become extremely large. This increases the possibility of making it difficult for the automobiles 2 to continue to appropriately perform the communication for the automated driving travel control. In other words, when the service server apparatus 70 for a service other than the automated driving directly communicates with the automobiles 2, there is an increased possibility of hindering the communication between the server apparatuses for the automated driving travel control and the automobiles 2. The more the number of the services provided to the automobiles 2 is increased, the more likely it is that the communication between the server apparatuses for the automated driving travel control and the automobiles 2 is hindered.

In the present embodiment, the assistance system 1 for the automobile 2 is presented that makes it possible to provide the automobile 2 with a service other than the automated driving travel control while reducing the communication load on the automobile 2 and thus making it difficult to hinder the communication for the automated driving travel control. In the assistance system 1 for the automobile 2, the server apparatus that provides a service other than the automated driving travel control provides a predetermined service to the automobile 2 that travels under the service for the automated driving travel control performed by the server apparatuses, basically without directly transmitting and receiving information to and from the automobile 2.

Next, the assistance system 1 for the automobile 2 as described above will be described in detail.

FIG. 2 is a main configuration diagram of a control system 20 of the automobile 2 illustrated in FIG. 1. The automobile 2 is an example of the vehicle. In another example, the vehicle includes a motorcycle, a cart, and personal mobility.

The control system 20 of the automobile 2 illustrated in FIG. 2 includes multiple control devices coupled to a vehicle network 30. FIG. 2 illustrates, as the control devices, a vehicle communication device 21, a vehicle state determination device 22, an own vehicle sensor control device 23, a driving operation control device 24, a travel control device 25, a drive control device 26, a steering control device 27, a braking control device 28, and an ABS (Anti-lock Brake System) control device 29. In another example, other control devices such as an air conditioner, an occupant monitoring device, and a light control device may be coupled to the vehicle network 30.

The vehicle network 30 may include, for example, a central gateway device and a cable that couples the control devices and the central gateway device with each other. The vehicle network 30 as above may be compliant with, for example, CAN (Controller Area Network) standard or LIN (Local Interconnect Network) standard. In another example, the vehicle network 30 may be compliant with LAN (Local Area Network) standard or a wireless communication standard.

The vehicle communication device 21 establishes a wireless communication path with the base stations 11 located outside the automobile 2, and transmits and receives information to and from the base stations 11. In another example, the vehicle communication device 21 may perform V2X (Vehicle to X) communication with another automobile 2 or the like located close to the own vehicle.

The vehicle state determination device 22 determines a state mainly related to the traveling of the automobile 2. The vehicle state determination device 22 collects information for determining the state of the automobile 2 from other control devices through the vehicle network 30, and records the information in a vehicle state memory 49. The vehicle state determination device 22 may determine, as the state of the automobile 2, for example, a malfunction in the operation of each device of the control system 20 and the quality of the wireless communication between the vehicle communication device 21 and the base stations 11, based on the information collected and recorded in the vehicle state memory 49.

Various kinds of sensors provided in the automobile 2 are coupled to the own vehicle sensor control device 23. The sensors provided in the automobile 2 include, for example, a vehicle GNSS receiver 31, an acceleration sensor 32, a speed sensor 33, a wheel speed sensor 34, a corner radar 35, a stereo camera 36, a LiDAR (Light Detection and Ranging) 37, an omnidirectional camera 38, and an actuator sensor 39.

The vehicle GNSS receiver 31 receives electric waves from the GNSS satellites 110 and generates information on a current position of the automobile 2 in which the vehicle GNSS receiver 31 is provided and a current time.

The acceleration sensor 32 detects an acceleration rate of the automobile 2 that is traveling. The acceleration sensor 32 may detect, for example, an acceleration rate in each of front, rear, left, right, up, and down directions, an acceleration rate in a pitch direction, an acceleration rate in a yaw direction, and an acceleration rate in a roll direction.

The speed sensor 33 detects a speed of the automobile 2 that is traveling.

The wheel speed sensor 34 detects a rotation speed of wheels of the automobile 2.

The corner radar 35 is provided in, for example, a blind spot of a vehicle body of the automobile 2, and detects a relative direction and a relative distance of a structural object around the automobile 2.

The stereo camera 36 captures an image of the outside of the vehicle in a front direction of the automobile 2.

The LiDAR 37 detects the relative direction and the relative distance to a structural object mainly in the front direction of the automobile 2 using a laser.

The omnidirectional camera 38 captures an image of the outside of the vehicle at 360 degrees around the automobile 2.

The actuator sensor 39 is provided for a non-illustrated suspension of the automobile 2, for example, and detects an operation state of the suspension.

The own vehicle sensor control device 23 controls operation of these various kinds of sensors and outputs detection values of the various kinds of sensors to the vehicle network 30.

The driving operation control device 24 is coupled to an operation member that is operated by a driver of the automobile 2 to manually cause the automobile 2 to travel. The operation member includes, for example, a steering, an accelerator pedal, a brake pedal, and a shift lever, which are non-illustrated, provided in the automobile 2. The driving operation control device 24 outputs, to the vehicle network 30, operation information of the driver on these operation members.

The drive control device 26 is coupled to a drive system including, for example, an engine, a motor, and a transmission, which are non-illustrated, provided in the automobile 2. The drive control device 26 uses an engine or a motor to generate a driving force corresponding to a control value. The drive control device 26 decelerates the driving force of the engine or the motor using the transmission in accordance with a control value, and transmits the decelerated driving force to the wheels. Thus, the wheels of the automobile 2 are rotationally driven. This makes it possible for the automobile 2 to travel while being accelerated.

The steering control device 27 is coupled to a non-illustrated steering device that changes a direction of the wheels of the automobile 2. The steering control device 27 changes the direction of the wheels to a direction corresponding to a control value using the steering device. This changes an advancing direction of the automobile 2.

The braking control device 28 is coupled to a non-illustrated braking device that reduces the rotation of the wheels of the automobile 2. The braking control device 28 applies a braking force corresponding to a control value to the wheels using the braking device. This allows the automobile 2 to decelerate and stop.

The ABS control device 29 outputs, to the braking control device 28, a control value for exerting a high braking force when, for example, another automobile 2 or the like approaches from the advancing direction of the own vehicle, based on an image captured by the stereo camera 36. This makes it possible for the automobile 2 to decelerate and stop before interfering with the other automobile 2 or the like.

The travel control device 25 outputs a control value to the drive control device 26, the steering control device 27, and the braking control device 28, and causes the automobile 2 to travel by manual driving or automated driving.

For example, in a case of the manual driving, the travel control device 25 generates a control value corresponding to the operation information of the operation member outputted to the vehicle network 30 by the driving operation control device 24, and outputs the control value to the drive control device 26, the steering control device 27, and the braking control device 28. This causes the automobile 2 to travel under the operation of the driver. On this occasion, the travel control device 25 may output, to the drive control device 26, the steering control device 27, and the braking control device 28, a control value obtained by adding or subtracting a correction value for assisting the operation to or from a control value based only on the operation information of the operation member.

In a case of the automated driving for autonomous traveling, the travel control device 25 determines the advancing direction, an advancing speed, or the like of the own vehicle, based on various kinds of detection values outputted to the vehicle network 30 by the own vehicle sensor control device 23, for example, based on a captured image of the stereo camera 36. Further, the travel control device 25 generates a control value corresponding to a determination result on the various kinds of detection values outputted from the own vehicle sensor control device 23, and outputs the control value to the drive control device 26, the steering control device 27, and the braking control device 28. This makes it possible for the automobile 2 to travel by autonomous automated driving.

Additionally, as will be described later, the travel control device 25 generates a control value, based on information acquired from the automated driving server apparatus, and outputs the control value to the drive control device 26, the steering control device 27, and the braking control device 28. This makes it possible for the automobile 2 to travel by the automated driving in accordance with remote control or traffic control of the automated driving server apparatus.

Note that the travel control device 25 may generate the control value by referring to the information acquired from the automated driving server apparatus during the automated driving for autonomous traveling depending on time and circumstances. Further, the travel control device 25 may generate the control value by referring to various kinds of detection values outputted to the vehicle network 30 by the own vehicle sensor control device 23 during the automated driving performed by the automated driving server apparatus depending on time and circumstances.

Additionally, the travel control device 25 includes a travel control memory and a travel control CPU (Central Processing Unit).

The travel control memory records, for example, programs and setting information for the travel control device 25 to execute the above-described various kinds of travel control. FIG. 2 illustrates high-precision map data for the vehicle recorded in the travel control memory. In addition to information on a link and a node indicating branching and merging of the road on which the automobile 2 travels, the high-precision map data may include information such as information on a reference traveling trajectory and information on a position of a stop line for each lane of the road. Traveling based on such information makes it possible for the automobile 2 traveling in the automated driving to travel while basically maintaining the lane and stopping at the stop line.

The travel control CPU reads and executes the programs recorded in the travel control memory. This implements, in the travel control device 25, a travel controller that executes control that causes the automobile 2 to travel under the travel control described above.

FIG. 3 is a main configuration diagram of the narrow area automated driving server apparatuses 50 illustrated in FIG. 1. Note that the wide area automated driving server apparatus 60 may also have the configuration similar to that in FIG. 3.

It is basically possible to control traveling of the automobiles 2 traveling in the region where the carrier communication networks 12 and 13 are laid by multiple narrow area automated driving server apparatuses 50 sharing the region zone by zone. Note that, however, there are differences between urban and suburban areas in the number of automobiles 2 in each zone. Further, a speed range of the automobiles 2 traveling on a freeway differs from a speed range of the automobiles 2 traveling on a general road. Thus, for example, the narrow area automated driving server apparatuses 50 may be installed for the automobiles 2 traveling on the general road in the urban area, and the automobiles 2 traveling in the suburban area or on the freeway may be managed by the wide area automated driving server apparatus 60. It is desirable that the narrow area automated driving server apparatuses 50 and the wide area automated driving server apparatus 60 be installed in combination as appropriate.

The narrow area automated driving server apparatus 50 illustrated in FIG. 3 includes a server GNSS receiver 51, an automated driving server CPU 52, an automated driving server memory 53, a first server communication device 54, a base station communication device 55, and an automated driving server bus 56 to which these devices are coupled.

The server GNSS receiver 51 receives electric waves from the GNSS satellites 110, and generates information on a current position and a current time of the narrow area automated driving server apparatus 50 provided with the server GNSS receiver 51. A deviation of such a current position and a current time from the current position and the current time of the automobile 2 may be small.

The base station communication device 55 is coupled to the local communication network 12. The base station communication device 55 is used by the narrow area automated driving server apparatus 50 to transmit and receive information to and from the automobile 2 through the local communication network 12 and the base station 11. FIG. 3 illustrates the vehicle communication device 21 provided in the control system 20 of the automobile 2 together with the base station 11. The base station communication device 55 is a communication device for the automobile 2 that is used for communication with the automobile 2 by transmitting and receiving information to and from the base station 11 that wirelessly communicates with the automobile 2. The communication device for the automobile 2 is provided in the base station 11 with which the automobile 2 wirelessly communicates, or is coupled to the carrier communication networks 12 and 13 that provide the base station 11.

The first server communication device 54 is coupled to the carrier wide area communication network 13. The first server communication device 54 is used by the narrow area automated driving server apparatus 50 to transmit and receive information to and from other server apparatuses through the carrier wide area communication network 13. FIG. 3 illustrates a service server apparatus 70 as the other server apparatus. The first server communication device 54 is used for communication with the service server apparatus 70.

Note that the wide area automated driving server apparatus 60 is basically coupled only to the carrier wide area communication network 13 out of the local communication network 12 and the carrier wide area communication network 13. In this case, the wide area automated driving server apparatus 60 includes at least the first server communication device 54. The wide area automated driving server apparatus 60 may transmit and receive information to and from other server apparatuses including the narrow area automated driving server apparatuses 50 and the base stations 11 through the carrier wide area communication network 13.

Further, in FIGS. 1 and 3, the narrow area automated driving server apparatuses 50 are coupled to the local communication network 12 and the carrier wide area communication network 13. In another example, when the local communication network 12 is coupled to the carrier wide area communication network 13 through the gateway device, the narrow area automated driving server apparatus 50 may include one communication device coupled to the local communication network 12. In this case, the narrow area automated driving server apparatus 50 may transmit and receive information to and from other server apparatuses including the wide area automated driving server apparatus 60 and the base stations 11 through the local communication network 12, the gateway device, and the carrier wide area communication network 13.

The automated driving server memory 53 records, for example, programs and setting information for the automated driving to be performed by the narrow area automated driving server apparatus 50. FIG. 3 illustrates high-precision map data 57 for the traffic control region and a vehicle database 58 that are recorded in the automated driving server memory 53. The high-precision map data 57 for the traffic control region is the data for the region managed by the narrow area automated driving server apparatus 50. The vehicle database 58 records information indicating, for example, traveling states of the automobiles 2 traveling in the region managed by the narrow area automated driving server apparatus 50.

The automated driving server CPU 52 reads and executes the programs recorded in the automated driving server memory 53. This implements an automated driving controller in the narrow area automated driving server apparatus 50.

Next, with reference to FIGS. 4 to 8, a description will be given of control for the automated driving of the multiple automobiles 2 performed by the assistance system 1 for the automobile 2 having the configuration illustrated in FIGS. 1 to 3.

Here, a case will be described as an example in which the multiple narrow area automated driving server apparatuses 50 directly communicate with the multiple automobiles 2 to control the traveling of the multiple automobiles 2 by remote control or traffic control. FIGS. 4 to 8 illustrate control for the automated driving of the multiple automobiles 2 under the narrow area automated driving server apparatus 50.

Note that the wide area automated driving server apparatus 60 may directly communicate with the automobiles 2 to control the traveling of the automobiles 2 by remote control or traffic control. In this case, the wide area automated driving server apparatus 60 executes control similar to that of the narrow area automated driving server apparatus 50 described below.

FIG. 4 is a flowchart of transmission control of each automobile 2 executed by the control system 20 of the automobile 2 illustrated in FIG. 2.

The control system 20 of the automobile 2 repeatedly executes the transmission control of FIG. 4 in every cycle requested by the automated driving by, for example, the travel control CPU or the vehicle communication device 21. Here, an example will be described in which the travel control CPU executes the transmission control of FIG. 4 using the vehicle communication device 21. The same applies to the following controls. Hereinafter, a cycle to be used for the automated driving is referred to as an automated driving travel control cycle Tc of the automobile 2.

In step ST1, the travel control CPU in the control system 20 of the automobile 2 determines whether or not it is transmission timing of the cycle requested by the automated driving. It is desirable that the travel control CPU perform a series of controls for the traveling of the automobile 2, for example, in every cycle of several hundred milliseconds or less. In this case, the travel control CPU may determine whether or not it is the transmission timing of the cycle requested by the automated driving, based on whether or not the cycle of the travel control has elapsed from the execution of the previous travel control. When the cycle of the travel control has not elapsed from the execution of the previous travel control, the travel control CPU determines that it is not the transmission timing, and repeats this process. In contrast, when the cycle of the travel control has elapsed from the execution of the previous travel control, the travel control CPU determines that it is the transmission timing, and causes the process to proceed to step ST2.

In step ST2, the travel control CPU acquires, for example, information indicating a latest traveling state of the automobile 2 as own vehicle information. The acquired information may be recorded in the travel control. The own vehicle information collected here may include, for example, a position, a time, a speed, an acceleration rate, and an execution state of the travel control detected by the automobile 2. The speed and the acceleration rate may be of, for example, each direction of pitch, yaw, and roll. Additionally, the collected own vehicle information may further include, for example, information indicating whether or not the ABS control device 29 is operated and timing of the operation of the ABS control device 29, and a flag indicating presence or absence of an emergency state of an occupant.

In step ST3, the travel control CPU transmits the latest own vehicle information collected in step ST2 to the narrow area automated driving server apparatus 50 through the vehicle communication device 21. The vehicle communication device 21 transmits the own vehicle information to the narrow area automated driving server apparatus 50 through the base station 11 with which a wireless communication path has been established.

FIG. 5 is a flowchart of reception control executed by the narrow area automated driving server apparatus 50 illustrated in FIG. 1.

The automated driving server CPU 52 of the narrow area automated driving server apparatus 50 repeatedly executes the reception control of FIG. 5. The narrow area automated driving server apparatus 50 is to receive the own vehicle information from each of the automobiles 2 as field information. Thus, the automated driving server CPU 52 is to repeatedly execute the reception control of FIG. 5 substantially constantly.

In step ST11, the automated driving server CPU 52 of the narrow area automated driving server apparatus 50 determines whether or not the base station communication device 55 receives new field information. For continuous automated driving control, the base station communication device 55 of the narrow area automated driving server apparatus 50 is to receive, through the base stations 11 in a service area of the narrow area automated driving server apparatus 50, the own vehicle information of each automobile 2 from the multiple automobiles 2 in the service area in every cycle requested by the automated driving. Thus, there is a high possibility that the base station communication device 55 is basically kept receiving new field information substantially continuously. When the base station communication device 55 receives the new field information, the automated driving server CPU 52 causes the process to proceed to step ST12. When the base station communication device 55 does not receive the new field information, the automated driving server CPU 52 repeats this process.

In step ST12, the automated driving server CPU 52 records, in the automated driving server memory 53, the own vehicle information of each automobile 2 acquired in step ST11. Thus, information including the latest own vehicle information of the automobiles 2 in the service area is accumulated and recorded in the vehicle database 58 of the automated driving server memory 53.

FIG. 6 is a flowchart of the travel control for the automobiles 2 executed by the narrow area automated driving server apparatus 50 illustrated in FIG. 1.

The automated driving server CPU 52 of the narrow area automated driving server apparatus 50 repeatedly executes the travel control for the automobiles 2 in FIG. 6. The narrow area automated driving server apparatus 50 is to generate and transmit travel control information for the automobiles 2 in every automated driving travel control cycle Ts of the server. It is desirable that the automated driving travel control cycle Ts of the server is at least the same as or shorter than the automated driving travel control cycle Tc of the automobile 2. When the automated driving travel control cycle Ts of the server becomes longer than the automated driving travel control cycle Tc of the automobile 2, the automobile 2 is to receive the travel control information with a delay from the automated driving travel control cycle of the own vehicle. In this case, the automobile 2 is to take measures such as continuing the control based on the previously received travel control information. There is a possibility that it becomes difficult for the automobile 2 that receives the travel control information after a delay from the automated driving travel control cycle of the own vehicle to continue traveling satisfactorily in accordance with the travel control performed by the narrow area automated driving server apparatus 50. Thus, the automated driving server CPU 52 is to repeatedly execute the travel control for the automobiles 2 in FIG. 6 substantially constantly.

In step ST21, the automated driving server CPU 52 determines whether or not it is generation timing of the travel control information for the automated driving. The automated driving server CPU 52 may determine whether or not it is the generation timing based on, for example, whether or not the automated driving travel control cycle Ts of the server has elapsed from the previous execution. When the automated driving travel control cycle Ts of the server has not elapsed, the automated driving server CPU 52 determines that it is not the generation timing, and repeats this process. When the automated driving travel control cycle Ts of the server has elapsed, the automated driving server CPU 52 determines that it is the generation timing, and causes the process to proceed to step ST22.

In step ST22, the automated driving server CPU 52 acquires the latest field information from the automated driving server memory 53.

In step ST23, the automated driving server CPU 52 maps the automobiles 2 included in the latest field information acquired in step ST22 to the high-precision map that is based on the high-precision map data of the service area. In the high-precision map, the automobiles 2 are mapped based on respective latest positions. The high-precision map used here may be configured, for example, as data for each road in the service area. In this case, each automobile 2 is to be mapped at the latest position to the road on which the automobile 2 is traveling.

In step ST24, the automated driving server CPU 52 determines interferences of the automobiles 2, based on the latest road states generated in step ST23. The presence or absence of an interference may be determined, for example, based on a threshold of an inter-vehicle distance corresponding to the speed.

In step ST25, the automated driving server CPU 52 generates the travel control information for each automobile 2. The travel control information generated here may be a control value of remote control that is usable as it is for the travel control of each automobile 2, or may be an instruction value of traffic control for acceleration, deceleration, and steering that causes each automobile 2 to generate a control value. For example, when the automobile 2 in an emergency situation is to be stopped on a road shoulder, the automated driving server CPU 52 may switch the instruction value of the normal traffic control to the control value of the remote control.

For example, the automated driving server CPU 52 may generate, for the automobile 2 that has been determined to cause no interference, the travel control information that maintains the current speed or the like.

In contrast, the automated driving server CPU 52 may generate, for the automobile 2 that has been determined to cause an interference, the travel control information that suppresses the interference.

In step ST26, the automated driving server CPU 52 transmits the travel control information generated in step ST25 to the automobile 2 that is traveling using the travel control information. The travel control information is transmitted from the base station communication device 55 to the automobile 2 through the carrier communication networks 12 and 13 and the base station 11.

In step ST27, the automated driving server CPU 52 records the travel control information generated in step ST25 in the automated driving server memory 53. As a result, the latest travel control information for the automobiles 2 in the service area is recorded in the vehicle database 58 of the automated driving server memory 53.

In step ST28, the automated driving server CPU 52 determines whether or not an unprocessed automobile 2 remains. When there remains an unprocessed automobile 2, the automated driving server CPU 52 causes the process to return to step ST24. The automated driving server CPU 52 basically generates and transmits the travel control information for all of the automobiles 2 traveling in the service area. After generating and transmitting the travel control information for all of these automobiles 2, the automated driving server CPU 52 determines that no unprocessed automobile 2 remains and ends this control.

As described above, the automated driving server CPU 52 of the narrow area automated driving server apparatus 50 generates and transmits the travel control information for the automobiles 2 in every automated driving travel control cycle Ts of the server. Processing for generating and transmitting the travel control information for the automobiles 2 takes a certain time period.

FIG. 7 is a flowchart of reception control of each automobile 2 executed by the control system 20 of the automobile 2 illustrated in FIG. 2.

The control system 20 of the automobile 2 repeatedly executes the reception control of FIG. 7, for example, by the travel control CPU or the vehicle communication device 21.

In step ST31, the travel control CPU determines whether or not the vehicle communication device 21 receives new information through the base station 11. When the narrow area automated driving server apparatus 50 is transmitting the travel control information addressed to the own vehicle, the vehicle communication device 21 receives the new information. In this case, the travel control CPU determines that the vehicle communication device 21 receives the new information, and causes the process to proceed to step ST32. When no new information is received, the travel control CPU repeats this process.

In step ST32, the travel control CPU records the new information received by the vehicle communication device 21 in the travel control memory. This makes it possible to record, in the travel control memory, the latest travel control information for the automated driving generated by the narrow area automated driving server apparatus 50, based on the latest travel environment.

FIG. 8 is a flowchart of the automated driving control of each automobile 2 executed by the control system 20 of the automobile 2 illustrated in FIG. 2.

The control system 20 of the automobile 2 repeatedly executes the automated driving control of FIG. 8 in every automated driving travel control cycle Tc of the automobile 2, for example, by the travel control CPU.

In step ST41, the travel control CPU determines whether or not it is timing to update the control for the automated driving. The travel control CPU may determine whether or not it is control updating timing based on, for example, whether or not the automated driving travel control cycle Tc of the automobile 2 has elapsed from the previous execution. When the automated driving travel control cycle Tc of the automobile 2 has not elapsed, the travel control CPU determines that it is not the control updating timing, and repeats this process. When the automated driving travel control cycle Tc of the automobile 2 has elapsed, the automated driving server CPU 52 determines that it is the control updating timing, and causes the process to proceed to step ST42.

In step ST42, the travel control CPU acquires the latest information from the travel control memory. The latest information acquired from the travel control memory may include the latest travel control information for the automated driving generated by the narrow area automated driving server apparatus 50 based on the latest travel environment.

In step ST43, the travel control CPU generates a control value, based on the information acquired in step ST42, and outputs the control value to the drive control device 26, the steering control device 27, and the braking control device 28 of the own vehicle. This makes it possible for the travel control CPU of the travel control device 25 to execute the automated driving in accordance with the latest travel control information generated by the narrow area automated driving server apparatus 50.

FIG. 9 is a timing chart of the travel control for the automobiles 2 in the assistance system 1 illustrated in FIG. 1.

FIG. 9 illustrates the automobile 2, the narrow area automated driving server apparatus 50, and the service server apparatus 70. In FIG. 9, time flows from top to bottom. FIG. 9 illustrates main steps of the travel control for the automobiles 2 performed by the above-described narrow area automated driving server apparatus 50.

For the travel control performed by the narrow area automated driving server apparatus 50, the automobile 2 acquires the information on the own vehicle in step ST2 in every automated driving travel control cycle Tc of the automobile 2, and transmits the vehicle information to the narrow area automated driving server apparatus 50 in step ST3.

The narrow area automated driving server apparatus 50 receives the vehicle information in step ST11 and records the vehicle information in the automated driving server memory 53 in step ST12. Further, the narrow area automated driving server apparatus 50 generates the travel control information in step ST25 in every automated driving travel control cycle Ts of the server, and transmits the generated travel control information in step ST26. Further, the narrow area automated driving server apparatus 50 executes the travel control for another automobile 2 not illustrated in FIG. 9 in step ST60.

The automobile 2 receives the travel control information from the narrow area automated driving server apparatus 50 in step ST31, and executes the travel control, based on the travel control information from the server in step ST43. It is desired that the travel control in step ST43 be repeatedly executed in every automated driving travel control cycle Tc of the automobile 2 for the travel control performed by the narrow area automated driving server apparatus 50.

Maintaining such a synchronous control state between the automobile 2 and the narrow area automated driving server apparatus 50 makes it possible for the automobiles 2 to continue to travel satisfactorily in accordance with the travel control of the narrow area automated driving server apparatus 50.

Assume that, for example, the service server apparatus 70 transmits and receives information directly to and from the automobile 2 to provide a service to each automobile 2 as indicated by a broken line in FIG. 9. In this case, the communication load on each automobile 2 increases. In particular, because the service server apparatus 70 communicates with the automobile 2 through the Internet 4, the communication is slow. When the automobile 2 executes such communication, there is an increased possibility that it becomes difficult for the automobile 2 to maintain the communication for the automated driving with the narrow area automated driving server apparatus 50 to the state illustrated in FIG. 9. There may be a possibility that it becomes difficult for the automobile 2 to keep executing the travel control in accordance with the travel control information from the narrow area automated driving server apparatus 50 in every automated driving travel control cycle Tc of the automobile 2.

Given the circumstances, in the present embodiment, the narrow area automated driving server apparatus 50 that controls the automated driving of the automobile 2 further relays information to be transmitted and received between the automobile 2 and the service server apparatus 70.

In this case, the automobile 2 acquires information to be transmitted to the service server apparatus 70 as the vehicle information in step ST2, and transmits the vehicle information to the narrow area automated driving server apparatus 50 in step ST3.

The narrow area automated driving server apparatus 50 receives the information from the automobile 2 in step ST11, and records the information in the automated driving server memory 53 in step ST12.

Further, the narrow area automated driving server apparatus 50 executes a server transmission process for transmitting the information to the service server apparatus 70 in step ST61 during a remaining time Tr to acquire, from the automated driving server memory 53, the information acquired from the automobile 2, and transmit the information to the service server apparatus 70. As a result, it is possible for the service server apparatus 70 to receive, from the narrow area automated driving server apparatus 50, the information that the automobile 2 has attempted to transmit to the service server apparatus 70. Further, the narrow area automated driving server apparatus 50 is to execute control for relaying in step ST61.

Here, the remaining time Tr refers to a period during which the process of generating and transmitting the travel control information for the automobiles 2 is not executed in the automated driving travel control cycle Ts of the server synchronized with the automated driving travel control cycle Tc of the automobile 2. In the automated driving travel control cycle Ts of the server, the remaining time Tr may occur depending on the number of the automobiles 2 whose traveling is controlled by the narrow area automated driving server apparatus 50. In the present embodiment, transmission of the information from the narrow area automated driving server apparatus 50 to the service server apparatus 70 is executed using the remaining time Tr. When the remaining time Tr is less than a minimum transmission time to be used to transmit information to the service server apparatus 70, the travel control CPU does not execute the transmission of the information from the narrow area automated driving server apparatus 50 to the service server apparatus 70 in the automated driving travel control cycle Ts of the server. The service of the service server apparatus 70 is not required to provide a high real-time performance of the service as in the case where the automated driving is controlled by the server.

Thereafter, the service server apparatus 70 records the information of each automobile 2 received from the narrow area automated driving server apparatus 50 in a service server memory 72. In step ST62, the service server apparatus 70 executes service processing for the automobile 2, based on the information on the automobile 2 acquired through the narrow area automated driving server apparatus 50. The service server apparatus 70 may transmit the information on the result of the service processing to the narrow area automated driving server apparatus 50 as necessary. In this case, the narrow area automated driving server apparatus 50 may transmit the information received from the service server apparatus 70 to the automobile 2 together with the travel control information in step ST26 as necessary. In step ST31, the automobile 2 receives the information transmitted by the service server apparatus 70 toward the automobile 2 through the narrow area automated driving server apparatus 50 together with the travel control information.

This makes it possible for the automobile 2 to receive and acquire the information transmitted by the service server apparatus 70 toward the automobile 2 without directly transmitting and receiving the information to and from the service server apparatus 70, and to use the information for the control of the own vehicle. It is possible for the automobile 2 to use services including, for example, an infotainment service, an entertainment service, and a monitoring service of the automobile 2, which are to be provided by the service server apparatus 70 to the automobile 2.

Further, even if the number of services used by the automobile 2 is increased by the service server apparatus 70 transmitting and receiving information to and from the automobile 2 through the narrow area automated driving server apparatus 50 as described above, it is possible to suppress a resulting increase in the communication load on the automobile 2. It is possible for the automobile 2 to use not only the automated driving by the narrow area automated driving server apparatus 50 but also various kinds of services other than the automated driving by communicating with the narrow area automated driving server apparatus 50 that makes it possible to constantly perform high-speed broadband communication.

FIG. 10 is a main configuration diagram of the service server apparatus 70 illustrated in FIG. 1. The road surface information updating server apparatus 5 and the vehicle malfunction estimation server apparatus 6 illustrated in FIG. 1 may basically have the configuration illustrated in FIG. 10.

The service server apparatus 70 illustrated in FIG. 10 includes a service server CPU 71, the service server memory 72, a second server communication device 73, and a service server bus 74 to which these devices are coupled.

The second server communication device 73 is coupled to the Internet 4. The second server communication device 73 is used by the service server apparatus 70 to transmit and receive information to and from other server apparatuses through the Internet 4 and the carrier communication networks 12 and 13. FIG. 10 illustrates, as other server apparatuses, the narrow area automated driving server apparatus 50 coupled to the carrier communication networks 12 and 13. The narrow area automated driving server apparatus 50 transmits and receives information to and from the narrow area automated driving server apparatus 50 through the carrier communication networks 12 and 13 and the Internet 4 coupled to the carrier communication networks 12 and 13. Transmission and reception of information through the Internet 4 is slower than transmission and reception of information through only the carrier communication networks 12 and 13.

The service server memory 72 records, for example, programs and setting information for providing a service by the service server apparatus 70. FIG. 10 illustrates high-precision map data 76 for an overall region and a vehicle database 75 that are recorded in the service server memory 72. The high-precision map data 76 for the overall region may be high-precision map data for the region where the carrier communication networks 12 and 13 are laid. The vehicle database 75 records information indicating, for example, traveling states of the automobiles 2 whose automated driving is assisted by the assistance system 1 for the automobile 2.

The service server CPU 71 reads and executes the programs recorded in the service server memory 72. This implements a service controller in the service server apparatus 70.

The service server CPU 71 as the service controller executes various kinds of control for the service provided by the service server apparatus 70.

For example, the service server CPU 71 transmits and receives information to and from the narrow area automated driving server apparatus 50 through the second server communication device 73 without directly transmitting and receiving information to and from the automobile 2.

The service server CPU 71 generates information usable in the service for the automobile 2 using the information regarding the automobile 2 acquired by the reception.

The service server CPU 71 transmits the generated information from the second server communication device 73 to the narrow area automated driving server apparatus 50.

FIG. 11 is a flowchart of execution management control in the server apparatus executed by the narrow area automated driving server apparatus 50 of FIG. 1. When the wide area automated driving server apparatus 60 also relays information between the automobile 2 and the service server apparatus 70, the execution management control of FIG. 11 may be executed.

The automated driving server CPU 52 of the narrow area automated driving server apparatus 50 repeatedly executes, as the automated driving controller, the execution management control of FIG. 11 in every automated driving travel control cycle Ts of the server.

In step ST51, the automated driving server CPU 52 calculates the remaining time Tr in the automated driving travel control cycle Ts of the server.

As illustrated in FIG. 9, the narrow area automated driving server apparatus 50 periodically executes control for the automated driving for the automated driving travel control of the automobile 2 in every automated driving travel control cycle Ts of the server. The control for the automated driving includes step ST25, step ST26, and step ST60.

Further, the automated driving server CPU 52 executes relay control for transmitting information to the service server apparatus 70 in step ST61 to transmit the information on the automobile 2 to the service server apparatus 70.

In this case, the automated driving server CPU 52 predicts or measures, for example, the time to be taken by the control for the automated driving in accordance with, for example, the number of automobiles 2 the travel control information of which is to be generated. Thereafter, the automated driving server CPU 52 may calculate the remaining time Tr by subtracting the predicted time or the measured time from the automated driving travel control cycle Ts of the server.

In step ST52, the automated driving server CPU 52 determines whether or not the remaining time Tr calculated in step ST51 is equal to or longer than the minimum transmission time. Here, the minimum transmission time may be a time to be taken by a series of processes used to transmit minimum information to the service server apparatus 70. When an apparatus transmits information, in general, header information or the like is added to the information to be transmitted to generate packet data, and a communication device transmits the packet data. When the transmission by the communication device is completed, the next information becomes transmittable. The minimum transmission processing time to be taken for such a series of processing may be set as the minimum transmission time. In another example, a time obtained by further adding, to the minimum transmission processing time, the time to be taken by normal reception processing for the information transmitted by the service server apparatus 70 to the narrow area automated driving server apparatus 50 may be set as the minimum transmission time.

When the remaining time Tr is not equal to or longer than the minimum transmission time, the automated driving server CPU 52 ends this control not to transmit the information to the service server apparatus 70. Thus, transmission of the information to the service server apparatus 70 is not executed in the present automated driving travel control cycle Ts of the server. When the process is so imminent that the remaining time Tr is less than the minimum transmission time, it is possible for the automated driving server CPU 52 to refrain from transmitting the information to the service server apparatus 70.

In contrast, when the remaining time Tr is equal to or longer than the minimum transmission time, the automated driving server CPU 52 causes the process to proceed to step ST53.

In step ST53, the automated driving server CPU 52 calculates the amount of information that is transmittable in the remaining time Tr.

In step ST54, the automated driving server CPU 52 instructs execution of transmission of the information to the service server apparatus 70. Note that the instruction to execute the transmission of the information is closed in the narrow area automated driving server apparatus 50. The automated driving server CPU 52 transmits a message instructing execution to the program for executing the server transmission process in step ST61 of FIG. 9, for example, by inter-program communication.

Thus, the automated driving server CPU 52 executes the server transmission process in step ST61 after completion of the control for the automated driving for the automated driving travel control of the automobile 2 in the present automated driving travel control cycle Ts of the server. On this occasion, the automated driving server CPU 52 acquires the information on the amount of information calculated in step ST53 from the automated driving server memory 53, and causes the information to be transmitted from the first server communication device 54 to the service server apparatus 70.

It is possible for the automated driving server CPU 52 to end the information transmission process of transmitting the information to the service server apparatus 70 before the completion of the present automated driving travel control cycle Ts of the server.

It is possible for the automated driving server CPU 52 to start the process of the next automated driving travel control cycle Ts of the server at predetermined timing in the cycle without a delay.

Further, the automated driving server CPU 52 uses the first server communication device 54 for the communication with the service server apparatus 70. This makes it possible for the narrow area automated driving server apparatus 50 to satisfactorily receive the information on each automobile 2 through the base station communication device 55 even during the communication with the service server apparatus 70 in step ST61 of FIG. 9.

As described above, the assistance system 1 for the automobile 2 according to the present embodiment includes the service server apparatus 70 in addition to the narrow area automated driving server apparatus 50 for the automated driving travel control of the automobile 2. The narrow area automated driving server apparatus 50 is provided in the base station 11 with which the automobile 2 wirelessly communicates, or is coupled to the carrier communication networks 12 and 13 that provide the base station 11. As a result, the narrow area automated driving server apparatus 50 is provided to be communicable, with a small delay, with the base station 11 that wirelessly communicates with the automobile 2, making it possible for the narrow area automated driving server apparatus 50 to repeatedly transmit and receive information to and from the automobile 2 that is traveling, with a small delay. In contrast, the service server apparatus 70 is coupled to the narrow area automated driving server apparatus 50 through the Internet 4, which is a communication network different from the carrier communication networks 12 and 13. The service server apparatus 70 does not directly transmit and receive information to and from the automobile 2, but transmits and receives the information regarding the automobile 2 to and from the narrow area automated driving server apparatus 50. On this occasion, the narrow area automated driving server apparatus 50 records, in the automated driving server memory 53, the information regarding the automobile 2 including the information acquired from the automobile 2, and transmits the information acquired from the automated driving server memory 53 to the service server apparatus 70 on behalf of the automobile 2. Additionally, the service server apparatus 70 generates information usable in the service for the automobile 2 using the information regarding the automobile 2 acquired by transmitting and receiving the information to and from the narrow area automated driving server apparatus 50 without directly transmitting and receiving the information to and from the automobile 2. This makes it possible for the assistance system 1 for the automobile 2 according to the present embodiment to generate, in the service server apparatus 70, information usable in the service for the automobile 2 that is useful for the traveling of the automobile 2, without excessively increasing the communication load between the automobile 2 and the narrow area automated driving server apparatus 50 to allow the communication repeatedly with a small delay.

In contrast, for example, when the service server apparatus 70 directly transmits and receives information to and from the automobile 2 separately from the narrow area automated driving server apparatus 50, there is an increased possibility that the communication between the service server apparatus 70 and the automobile 2 hinders the communication between the automobile 2 and the narrow area automated driving server apparatus 50. Here, when the service server apparatus 70 communicates with the automobile 2 through the Internet 4 and the carrier communication networks 12 and 13, the automobile 2 takes a long time to communicate with the service server apparatus 70. In this case, there is a high possibility that the communication load that is increased in the automobile 2 becomes more than just an increase in a volume of communication. The automobile 2 may be to, at least, frequently execute a process of switching a communication target between the narrow area automated driving server apparatus 50 and the service server apparatus 70. The present embodiment makes it possible for the service server apparatus 70 to generate and provide information useful for traveling of the automobile 2, which is difficult to be provided by the narrow area automated driving server apparatus 50, without causing such an increase in the communication load on the automobile 2, which may possibly hinder the automated driving travel control of the automobile 2. In the present embodiment, it is possible for the automobile 2 to continue to appropriately execute the communication for the automated driving travel control. The present embodiment makes it possible to improve the service for the automobile 2.

Moreover, in the present embodiment, the narrow area automated driving server apparatus 50 does not equally execute the control for the automated driving that transmits and receives the information for the automated driving travel control to and from the automobile 2, and the relay control of relaying the information between the narrow area automated driving server apparatus 50 and the service server apparatus 70, but executes the control for the automated driving taking priority over the relay control.

To achieve the above, the narrow area automated driving server apparatus 50 records, in the automated driving server memory 53, the information received from the automobile through the base station communication device 55, which is a vehicle-side communication device, in the reception control. Further, in the control for the automated driving, the narrow area automated driving server apparatus 50 determines the traveling state of the vehicle, based on the information recorded in the automated driving server memory 53. The narrow area automated driving server apparatus 50 further generates information regarding the automated driving travel control of the automobile 2 and repeatedly transmits the generated information to the automobile 2 through the base station communication device 55.

Further, the narrow area automated driving server apparatus 50 executes the execution management control separately from the control for the automated driving and the relay control to manage, in the narrow area automated driving server apparatus 50, the execution of the control for the automated driving periodically executed for the automated driving travel control of the automobile 2 and the execution of the relay control that transmits information to the service server apparatus 70. In the execution management control, the narrow area automated driving server apparatus 50 manages the execution of the relay control to execute the relay control in the remaining period Tr in which the control for the automated driving is not executed during the automated driving travel control cycle Ts of the server for the control of the automated driving.

This makes it possible for the narrow area automated driving server apparatus 50 to execute the relay control that transmits information to the service server apparatus 70 at timing when the control for the automated driving is not executed.

The transmission of the information regarding the automated driving travel control of the automobile 2 from the narrow area automated driving server apparatus 50 to the automobile 2 that is traveling is less likely to be hindered due to the transmission to the service server apparatus 70.

This makes it possible for the narrow area automated driving server apparatus 50 to execute the control for the automated driving between the narrow area automated driving server apparatus 50 and the automobile 2 with the quality and the frequency equivalent to those in a case where the relay control is not executed between the narrow area automated driving server apparatus 50 and the service server apparatus 70.

It is possible for the automated driving server apparatus to control the traveling of the automobile 2 without reducing the communication quality or the communication frequency with the automobile 2 for the automated driving travel control of the automobile 2, that is, without reducing the quality of the automated driving travel control of the automobile 2 performed by the narrow area automated driving server apparatus 50.

Further, in the present embodiment, the narrow area automated driving server apparatus 50 includes the base station communication device 55 that transmits and receives information to and from the base station 11 that wirelessly communicates with the automobile 2, and the first server communication device 54 that transmits and receives information to and from the service server apparatus 70. The narrow area automated driving server apparatus 50 transmits, to the automobile 2, the information regarding the automated driving travel control of the automobile 2, which is generated by the control for the automated driving, using the base station communication device 55. The narrow area automated driving server apparatus 50 also transmits the information regarding the automobile 2 to be transmitted by the relay control to the service server apparatus 70 using the first server communication device 54. This makes it possible for the narrow area automated driving server apparatus 50 to receive the information that is repeatedly transmitted by the automobile 2 by the base station communication device 55 even when the information regarding the automobile 2 to be transmitted by the relay control is being transmitted.

As described above, the assistance system 1 for the automobile 2 according to the present embodiment makes it possible to provide the automobile 2 with a service other than the automated driving travel control while reducing the communication load on the automobile 2 and thus making it difficult to hinder the communication for the automated driving travel control. The assistance system 1 for the automobile 2 according to the present embodiment makes it possible to provide the automobile 2 with multiple services including the automated driving travel control without hindering the automated driving travel control. Even if the number of services for the automobile 2 is increased, the present embodiment makes it difficult to hinder the communication between the server apparatus for the automated driving travel control and the automobile 2.

Second Embodiment

Next, the assistance system 1 for the automobile 2 according to a second embodiment of the invention will be described.

In the above-described embodiment, the narrow area automated driving server apparatus 50 that relays between the automobile 2 and the service server apparatus 70 is mainly described. In the present embodiment, a description is given of a case where the service server apparatus 70 is the vehicle malfunction estimation server apparatus 6 in particular.

The vehicle malfunction estimation server apparatus 6 acquires, through the narrow area automated driving server apparatus 50, the information on the automobile 2 whose traveling in the automated driving is controlled by the narrow area automated driving server apparatus 50. The vehicle malfunction estimation server apparatus 6 estimates a malfunction in the automobile 2, based on the acquired information. The vehicle malfunction estimation server apparatus 6 transmits the malfunction estimation information to the automobile 2 through the narrow area automated driving server apparatus 50.

In the present embodiment, the same reference numerals are used for the components similar to those in the above-described embodiment, and illustration and description thereof are omitted. In the following description, differences from the above-described embodiment will be mainly described.

FIG. 12 is an explanatory diagram of communication information for dealing with a malfunction in the automobile 2 in the assistance system 1 for the automobile 2 according to the second embodiment of the invention.

In the present embodiment, the automobile 2 transmits, to the narrow area automated driving server apparatus 50, information that notifies of an emergency situation of the own vehicle and information for estimating a malfunction in the suspension of the own vehicle together with information for receiving the assistance of the automated driving, as the own vehicle information.

To achieve the above, the automobile 2 may transmit, for example, the travel information such as the vehicle speed, the position, the advancing direction, and the yaw rate, and information on a vehicle abnormality flag including, without limitation, a MIL lighting flag to the narrow area automated driving server apparatus 50 as the own vehicle information.

The narrow area automated driving server apparatus 50 records the own vehicle information received from the automobile 2 in the automated driving server memory 53. Thereafter, it is possible for the narrow area automated driving server apparatus 50 to generate the travel control information for the automated driving at timing when the automated driving control cycle of the server comes.

FIG. 13 is a flowchart of the reception control executed by the narrow area automated driving server apparatus 50 according to the present embodiment.

The automated driving server CPU 52 of the narrow area automated driving server apparatus 50 repeatedly executes the reception control of FIG. 13 instead of the reception control of FIG. 5.

When the base station communication device 55 as the vehicle-side communication device receives new information from the automobile 2, the automated driving server CPU 52 repeatedly executes the reception control of FIG. 13 prior to the automated driving travel control of the automobile 2.

Step ST11 and step ST12 are similar to those in FIG. 5. Note that, however, after step ST12 is executed, the automated driving server CPU 52 causes the process to proceed to step ST71.

In step ST71, the automated driving server CPU 52 determines whether or not the own vehicle information received from the automobile 2 includes information requesting an emergency response to the automobile 2. The own vehicle information may include valid information on the vehicle abnormality flag including, without limitation, the MIL lighting flag. In this case, the automated driving server CPU 52 determines that the own vehicle information received from the automobile 2 includes the information requesting the emergency response to the automobile 2, and causes the process to proceed to step ST72. When it is not determined that the own vehicle information received from the automobile 2 includes the information requesting the emergency response to the automobile 2, the automated driving server CPU 52 ends this control.

In step ST72, the automated driving server CPU 52 generates a request to switch the automobile 2 requesting the emergency response to autonomous driving.

In step ST73, the automated driving server CPU 52 transmits, through the base station communication device 55, the request to switch to the autonomous driving generated in step ST72 to the automobile 2 that has transmitted the own vehicle information. Thereafter, the automated driving server CPU 52 ends this control.

Upon receipt of the request to switch to the autonomous driving, the automobile 2 switches the control from the automated driving based on the travel control information from the narrow area automated driving server apparatus 50 to the manual driving performed by the driver or the automated driving for autonomous traveling.

Further, as illustrated in FIG. 12, the narrow area automated driving server apparatus 50 transmits, for example, the information received from the automobile 2 to the vehicle malfunction estimation server apparatus 6.

The vehicle malfunction estimation server apparatus 6 receives information for estimating a malfunction in the automobile 2 from the narrow area automated driving server apparatus 50.

The vehicle malfunction estimation server apparatus 6 records the received information in the service server memory 72. Thus, the information for estimating a malfunction in the automobile 2 regarding the automobile 2 whose traveling is controlled by the narrow area automated driving server apparatus 50 may be accumulated and recorded in the vehicle database 75 of the service server memory 72.

FIG. 14 is a flowchart of malfunction estimation control executed by the vehicle malfunction estimation server apparatus 6.

The service server CPU 71 of the vehicle malfunction estimation server apparatus 6 repeatedly executes the malfunction estimation control of FIG. 14.

The service server CPU 71 may repeatedly execute the malfunction estimation control of FIG. 14 basically at timing when unprocessed information on the automobile 2 has accumulated to some extent in the service server memory 72.

In step ST81, the service server CPU 71 selects a traveling section for evaluating a malfunction in the automobile 2 in the high-precision map data 76 of the overall region in the service server memory 72. The service server CPU 71 may select a travel environment suitable for determining a malfunction in, for example, the suspension of the automobile 2 in a path on which the automobile 2 has traveled. A sign of malfunction in the suspension may occur, for example, when the automobile 2 is traveling on a straight paved road with small irregularities at a constant speed. Thus, the service server CPU 71 selects a section where the automobile 2 is traveling on a straight paved road with small irregularities at a constant speed.

In step ST82, the service server CPU 71 extracts information on an actual yaw rate of the automobile 2 in the traveling section selected in step ST81.

In step ST83, the service server CPU 71 generates yaw rates of multiple virtual automobiles 2 in the traveling section.

The service server CPU 71 may, for example, execute a travel simulation in the traveling section for the virtual automobiles 2 to generate the yaw rates of the virtual automobiles 2.

In another example, the service server CPU 71 may extract, from the service server memory 72, information on the yaw rate of another automobile 2 that actually travels in the traveling section and has no malfunction as the information on the virtual automobiles 2.

Further, the service server CPU 71 may generate the yaw rates of the virtual automobiles 2 by executing the travel simulation in the traveling section for the virtual automobiles 2 in which a malfunction has occurred in the suspension.

In step ST84, the service server CPU 71 records the information on the yaw rates of the virtual automobiles 2 acquired in step ST83 in the service server memory 72.

In step ST85, the service server CPU 71 determines a similarity level between a waveform of the actual yaw rate in the traveling section and a waveform of the yaw rate of each of the virtual automobiles 2 in the traveling section. The service server CPU 71 compares the waveform of the actual yaw rate with the waveform of the yaw rate of each of the virtual automobiles 2.

In step ST86, the service server CPU 71 determines whether or not the similarity level of the waveform of the actual yaw rate in the traveling section to the waveform of the yaw rate of the virtual automobile 2 in which the suspension is in a normal state is high. When the similarity level is high, the service server CPU 71 ends this control. When the similarity level is not high, the service server CPU 71 causes the process to proceed to step ST87.

In step ST87, the service server CPU 71 transmits the malfunction estimation information on the suspension from the second server communication device 73 to the narrow area automated driving server apparatus 50. Further, the narrow area automated driving server apparatus 50 transmits the malfunction estimation information on the suspension to the automobile 2 together with the travel control information.

The automobile 2 records the malfunction estimation information on the suspension in the travel control memory. Further, the automobile 2 may turn on a warning lamp, based on the malfunction estimation information on the suspension.

As a result, as illustrated in FIG. 12, it is possible for the automobile 2 to receive the travel control information for the automated driving and the request to switch to the autonomous driving for the emergency response from the narrow area automated driving server apparatus 50. Additionally, it is possible for the automobile 2 to receive the malfunction estimation information on the suspension from the vehicle malfunction estimation server apparatus 6 through the narrow area automated driving server apparatus 50. It is possible for the automobile 2 to use an emergency response service and, moreover, the estimation service for a malfunction in the own vehicle together with the travel control service for the automated driving performed by the narrow area automated driving server apparatus 50.

FIG. 15 is a graph illustrating waveforms of the yaw rates corresponding to the traveling position of the automobiles 2 including the automobile 2 whose traveling is controlled by the assistance system 1.

In FIG. 15, the waveform (Real Data) of the actual yaw rate of the automobile 2 intended for the estimation of a malfunction is indicated by a broken line. Additionally, FIG. 15 illustrates both the waveforms (SimA and SimB) of the yaw rates of two virtual automobiles 2 in which the suspension is operating normally and the waveform (SimC) of the yaw rate of one virtual automobile 2 in which the suspension is not operating normally.

In the case of FIG. 15, the waveform (Real Data) of the actual yaw rate of the automobile 2 intended for the estimation of a malfunction is highly similar to the waveforms (SimA and SimB) of the yaw rates of the two virtual automobiles 2 in which the suspension is operating normally.

In contrast, the similarity to the waveform (SimC) of the yaw rate of one virtual automobile 2 in which the suspension is not operating normally is low.

FIG. 16 is a graph illustrating the similarity levels of the waveforms of the yaw rates illustrated in FIG. 15 between the waveform of the automobile 2 whose traveling is controlled by the assistance system 1 and the waveforms of other automobiles 2.

FIG. 16 illustrates the cosine similarity level (average value) between the waveform (Real Data) of the actual yaw rate of the automobile 2 intended for the estimation of a malfunction and the waveform of the yaw rate of each of the virtual automobiles 2.

In this case, the cosine similarity levels (average values) with respect to the waveforms (SimA and SimB) of the yaw rates of the two virtual automobiles 2 in which the suspension is operating normally both have negative equivalent values.

In contrast, the cosine similarity level (average value) with respect to the waveform (SimC) of the yaw rate of one virtual automobile 2 in which the suspension is not operating normally has a positive value.

The service server CPU 71 may determine, in step ST85, the cosine similarity levels between the waveforms of the yaw rates as illustrated in FIG. 16.

Further, the service server CPU 71 may determine, in step ST86, the similarity level of the waveform (Real Data) of the actual yaw rate, based on the cosine similarity levels between the waveforms of the yaw rates as illustrated in FIG. 16.

In determining the similarity level, the service server CPU 71 may determine, for example, whether or not the similarity level with respect to the waveforms of the yaw rates of the virtual automobiles 2 in which the suspension is in the normal state is high, based on the comparison of the cosine similarity levels (average values) in FIG. 16.

In another example, the service server CPU 71 may determine the similarity level, based only on the similarity levels with respect to the waveforms of the yaw rates of the virtual automobiles 2 in which the suspension is in the normal state illustrated in FIG. 16, for example.

As described above, in the present embodiment, the narrow area automated driving server apparatus 50 provided to be communicable, with a small delay, with the base station 11 that wirelessly communicates with the automobile 2 executes control for dealing with an emergency situation of the automobile 2. Specifically, the narrow area automated driving server apparatus 50 determines whether or not the information acquired from the automobile 2 includes emergency response information for the automated driving travel control performed by the narrow area automated driving server apparatus 50. When the emergency response information is included, the narrow area automated driving server apparatus 50 transmits an autonomous driving switching request to the automobile 2 to cause the automobile 2 to autonomously control the traveling without depending on the control performed by the narrow area automated driving server apparatus 50.

Moreover, in the present embodiment, the narrow area automated driving server apparatus 50 determines whether or not the emergency response information is included at the timing of acquiring the information from the automobile 2 prior to the control for the automated driving for the automated driving travel control of the automobile 2. When the narrow area automated driving server apparatus 50 receives information on the traveling state of the automobile 2 including the emergency response information from the automobile 2, it is possible to immediately transmit the autonomous driving switching request at that timing.

Thus, when it is determined that the emergency response to the automated driving travel control performed by the narrow area automated driving server apparatus 50 is necessary, it is possible for the automobile 2 according to the present embodiment to immediately respond to the situation by notifying the narrow area automated driving server apparatus 50 of the determination and to switch the travel control of the own vehicle to the autonomous travel control from the control performed by the narrow area automated driving server apparatus 50. It is possible for the narrow area automated driving server apparatus 50 to immediately respond to the situation that requires an immediate response.

Moreover, in the present embodiment, the information on the traveling state of the automobile 2 is transmitted from the narrow area automated driving server apparatus 50 to the vehicle malfunction estimation server apparatus 6. Thereafter, the vehicle malfunction estimation server apparatus 6 compares the information on the traveling state of the automobile 2 to be acquired with the information on the traveling state of other automobiles 2 that are supposed to be traveling in the normal state, or further, that are supposed to be not traveling in the normal state. Additionally, when the vehicle malfunction estimation server apparatus 6 is unable to determine that the automobile 2 related to the information regarding the automobile 2 is traveling in the normal state, using the determination based on the similarity levels of the information on the traveling states of the automobiles 2 according to the comparison, the vehicle malfunction estimation server apparatus 6 generates, as information usable in the service for the automobile 2, the malfunction estimation information indicating that a malfunction is estimated in the automobile 2, and transmits the malfunction estimation information to the automobile 2 via the narrow area automated driving server apparatus 50. This makes it possible for the assistance system 1 for the automobile 2 according to the present embodiment to provide the automobile 2 with not only the service of the automated driving travel control for responding to the emergency situation with high quality repeatedly with a small delay, but also the service of the information about the estimation of a malfunction in the automobile 2.

In particular, in the present embodiment, the vehicle malfunction estimation server apparatus 6 includes a memory that stores the map data. The service controller receives and acquires information on the yaw rate indicating the traveling state of the automobile 2 detected by the automobile 2 as the information regarding the automobile 2 acquired through the narrow area automated driving server apparatus 50. The service controller compares the information on the traveling state of the automobile 2 based on the yaw rate when the automobile 2 is traveling straight at a stable speed in the map data with one or more of the information on the yaw rate of another automobile 2 traveling in the normal state and the information on the yaw rate of another automobile 2 traveling with an abnormality in the suspension. Additionally, when the service controller is unable to determine that the automobile 2 is traveling in the normal state, using the determination based on the similarity levels of the information on the waveforms of the yaw rates of the automobiles 2 during traveling according to the comparison, the service controller generates the malfunction estimation information indicating that a malfunction is estimated in the suspension of the automobile 2 as information usable in the service for the automobile 2, and transmits the malfunction estimation information to the automobile 2 via the narrow area automated driving server apparatus 50. Thus, in the present embodiment, it is possible to determine the possibility of a malfunction in the suspension of the automobile 2 for the automobile 2 whose traveling is controllable by the narrow area automated driving server apparatus 50.

In the present embodiment, it is possible for the assistance system 1 for the automobile 2 not only to simply control the traveling of the automobile 2, but also to provide a service that determines the possibility of a malfunction occurring in the automobile 2. Moreover, in the present embodiment, because only the narrow area automated driving server apparatus 50 communicates with the automobile 2, even if a service that determines the possibility of a malfunction occurring in the automobile 2 is added, it is possible to maintain a high-quality service of the automated driving travel control of the automobile 2 repeatedly provided with a small delay.

Third Embodiment

Next, the assistance system 1 for the automobile 2 according to a third embodiment of the invention will be described.

The above-described embodiment mainly describes matters related to, for example, the narrow area automated driving server apparatus 50 that relays between the automobile 2 and the service server apparatus 70. In the present embodiment, a description is given of a case where, in particular, the service server apparatus 70 is the road surface information updating server apparatus 5.

The road surface information updating server apparatus 5 acquires, through the narrow area automated driving server apparatus 50, information on the automobile 2 whose traveling in the automated driving is controlled by the narrow area automated driving server apparatus 50. The road surface information updating server apparatus 5 determines the road surface condition of the road on which the automobile 2 travels based on the acquired information. The road surface information updating server apparatus 5 updates the high-precision map data for the service area of the narrow area automated driving server apparatus 50 in accordance with the determined road surface condition. The narrow area automated driving server apparatus 50 generates the travel control information for the automated driving of the automobile 2 using the updated high-precision map data, and transmits the travel control information to the automobile 2.

In the present embodiment, the same reference numerals are used for the components similar to those in the above-described embodiments, and illustration and description thereof are omitted. In the following description, differences from the above-described embodiments will be mainly described.

FIG. 17 is an explanatory diagram illustrating communication information for updating road surface information in the assistance system 1 for the automobile 2 according to the third embodiment of the invention.

The service server CPU 71 of the road surface information updating server apparatus 5 is, FIG. 17 is an explanatory diagram illustrating the communication information for updating the road surface information in the assistance system 1 for the automobile 2 according to the third embodiment of the invention.

In the present embodiment, the automobile 2 transmits, to the narrow area automated driving server apparatus 50, the information that notifies of an emergency situation of the own vehicle and the information regarding the road surface on which the own vehicle is traveling together with the information for receiving the assistance of the automated driving, as the own vehicle information.

To achieve the above, the automobile 2 may transmit, for example, the travel information such as the vehicle speed, the position, the advancing direction, the ABS information, and the wheel speed information, and an outside-vehicle image captured by the stereo camera 36 or the like of the own vehicle to the narrow area automated driving server apparatus 50 as the own vehicle information.

The narrow area automated driving server apparatus 50 records the own vehicle information received from the automobile 2 in the automated driving server memory 53. Thereafter, it is possible for the narrow area automated driving server apparatus 50 to generate the travel control information for the automated driving at timing when the automated driving control cycle of the server comes.

It is possible for the narrow area automated driving server apparatus 50 to collectively receive and acquire, from the automobile 2, information on the outside-vehicle image captured by the automobile 2 in addition to the information on the traveling state of the automobile 2 during communication with the automobile 2 at each time in the control for the automated driving for the automated driving travel control of the automobile 2.

Further, as illustrated in FIG. 17, the narrow area automated driving server apparatus 50 transmits, for example, information received from the automobile 2 to the road surface information updating server apparatus 5.

The road surface information updating server apparatus 5 receives, from the narrow area automated driving server apparatus 50, information for determining a state of the road surface on which the automobile 2 travels.

The road surface information updating server apparatus 5 records the received information in the service server memory 72. Thus, in the vehicle database 75 of the service server memory 72, the information on the automobile 2 that has traveled on the road surface may be accumulated and recorded together with the information on the road surface on which the automobile 2 is traveling whose traveling is controlled by the narrow area automated driving server apparatus 50.

FIG. 18 is a flowchart of control executed by the road surface information updating server apparatus 5 to update the map data, based on slippery road surface information.

The service server CPU 71 of the road surface information updating server apparatus 5 repeatedly executes control that updates the map data illustrated in FIG. 18.

The service server CPU 71 may repeatedly execute the control that updates the map data illustrated in FIG. 18 basically at timing when unprocessed information on the automobile 2 has accumulated to some extent in the service server memory 72.

In step ST90, the service server CPU 71 acquires the ABS information from the service server memory 72. The ABS information includes information indicating whether or not the ABS control device 29 is operated and operation timing of the ABS control device 29.

In step ST91, the service server CPU 71 determines, based on the acquired ABS information, whether or not the traveling state of the automobile 2 is a slip state.

For example, when the wheels of the automobile 2 during traveling stop rotating during braking control, the ABS control device 29 executes ABS control that causes the rotation of the wheels to be restored. Thus, the wheels that has been slipping against the road surface regain a grip force with the road surface, making it possible to enhance a deceleration effect by the braking control. Such a road surface causes the automobile 2 to easily slip. Further, when the road surface is frozen, or the road surface includes a metal plate or a metal manhole, the wheels of the automobile 2 easily slip against the road surface.

Accordingly, when the acquired ABS information includes, for example, information indicating the operation of the ABS control device 29, the service server CPU 71 determines that the traveling state of the automobile 2 is the slip state, and causes the process to proceed to step ST92. When it is not determined that the traveling state of the automobile 2 is the slip state, the service server CPU 71 ends this control.

In step ST92, the service server CPU 71 sets, as a slip section, a section in which the ABS control device 29 has been operated within the road on which the automobile 2 has been traveling. The slip section may include a margin section of a predetermined length before and after the section in which the ABS control device 29 has been operated.

In step ST93, the service server CPU 71 selects, from the service server memory 72, the outside-vehicle image capturing the slip section.

In step ST94, the service server CPU 71 analyzes the road surface in the outside-vehicle image selected in step ST93.

The kind of road surface on which the automobile 2 travels includes, for example, paved roads and rough roads including gravel and soil. Additionally, the state of the road surface changes due to, for example, rainfall, snowfall, water accumulation, flooding, or falling rocks. Further, the road surface is sometimes provided with a manhole, a road surface mark, or a metal plate used during, for example, construction.

The service server CPU 71 may analyze the characteristics of the road surface including information on the kind of road surface and the state of the road surface by analyzing the road surface in the outside-vehicle image.

In step ST95, the service server CPU 71 identifies the state of the road surface, based on a result of the analysis in step ST94.

The service server CPU 71 identifies the kind and the state of the road surface of the slip section.

Accordingly, the service server CPU 71 is to determine whether a cause that has led to the operation of the ABS control device 29 in the automobile 2 is mainly in the automobile 2 or mainly in the road surface.

For example, on a dry paved road, the ABS control device 29 is hardly operated when the automobile 2 does not rapidly decelerate.

In contrast, when there is, for example, snowfall or water accumulation on the road surface, the ABS control device 29 is sometimes operated even in normal traveling of the automobile 2.

It is possible to determine, with certainty, the section of the road surface on which the automobile 2 easily slips using the ABS information indicating the operation of the ABS control device 29 and the outside-vehicle image capturing the road surface in combination.

In step ST96, the service server CPU 71 generates the road surface information of the slip section in step ST95.

The road surface information of the slip section is sometimes information on a dry paved road or is sometimes information on, for example, snowfall or water accumulation on the road surface.

In step ST97, the service server CPU 71 determines whether or not the road surface has a low mu.

When there is, for example, snowfall or water accumulation on the road surface, the road surface generally has a low mu and is slippery.

In contrast, in a case of a paved road with a dry road surface, the road surface generally has a high mu and is not slippery.

The service server CPU 71 may determine whether or not the road surface has a low mu, based on the information on the kind and the state of the road surface included in the road surface information of the slip section.

When it is determined that the road surface in the slip section has a low mu, the service server CPU 71 causes the process to proceed to step ST98.

When it is not determined that the road surface in the slip section has a low mu, the service server CPU 71 ends this control.

In step ST98, the service server CPU 71 updates the high-precision map data 76 of the overall region recorded in the service server memory 72 with the road surface information of the slip section that has been determined to have a low mu. As a result, the high-precision map data including the road surface information of the slip section is generated in the service server memory 72.

In step ST99, the service server CPU 71 transmits the high-precision map data including the road surface information of the slip section to the narrow area automated driving server apparatus 50 through the second server communication device 73.

FIG. 19 is a flowchart of map data updating control executed by the narrow area automated driving server apparatus 50 in accordance with the control performed by the road surface information updating server apparatus 5 illustrated in FIG. 18.

The automated driving server CPU 52 of the narrow area automated driving server apparatus 50 repeatedly executes the map data updating control of FIG. 19.

In step ST101, the automated driving server CPU 52 determines whether or not the high-precision map data for an update is received from the road surface information updating server apparatus 5. When the high-precision map data for the update is not received from the road surface information updating server apparatus 5, the automated driving server CPU 52 ends this control. When the high-precision map data for the update is received from the road surface information updating server apparatus 5, the automated driving server CPU 52 causes the process to proceed to step ST102.

In step ST102, the automated driving server CPU 52 updates the high-precision map data of the service area recorded in the automated driving server memory 53 with the high-precision map data received from the road surface information updating server apparatus 5. Thereafter, the automated driving server CPU 52 ends this control.

Thus, the high-precision map data of the service area recorded in the automated driving server memory 53 is updated to include the road surface information of the slip section generated in the road surface information updating server apparatus 5.

FIG. 20 is a flowchart of a process of generating the travel control information for the automobile 2 responding to the update of the map data and executed by the narrow area automated driving server apparatus 50 in step ST25 of FIG. 6.

The automated driving server CPU 52 of the narrow area automated driving server apparatus 50 executes the process of generating the travel control information for the automobile 2 illustrated in FIG. 20 in the process of generating the travel control information for each automobile 2 in step ST25 of FIG. 6.

In step ST111, the automated driving server CPU 52 determines whether or not there is road surface information of the slip section for the section of the road on which the selected automobile 2 is going to travel.

The automated driving server CPU 52 acquires information on the section of the road on which the selected automobile 2 is going to travel from the latest high-precision map data recorded in the automated driving server memory 53, and determines whether or not there is road surface information of the slip section.

Thereafter, when there is no road surface information of the slip section, the automated driving server CPU 52 causes the process to proceed to step ST113.

In contrast, when there is road surface information of the slip section, the automated driving server CPU 52 causes the process to proceed to step ST112.

In step ST112, the automated driving server CPU 52 sets a generation condition of the travel control information because the road surface information of the slip section is included in the section of the road on which the selected automobile 2 is going to travel.

Specifically, for example, the automated driving server CPU 52 sets a condition that reduces the speed in accordance with the state of the road surface of the slip section.

In step ST113, the automated driving server CPU 52 generates the travel control information for the selected automobile 2.

When the process has proceeded from step ST111 to step ST113, because the road surface information of the slip section is not included in the high-precision map data, the generation condition of the travel control information does not include the generation condition set in step ST112. In this case, the automated driving server CPU 52 generates the travel control information to suppress interference with other vehicles that has a possibility of interference, based on the travel environment as normal, without reducing the speed in accordance with the state of the road surface.

In contrast, when the road surface information of the slip section is included in the high-precision map data, the generation condition of the travel control information includes the generation condition set in step ST112. In this case, the automated driving server CPU 52 generates the travel control information that suppresses interference with other vehicles that has a possibility of interference and also reduces the speed in accordance with the state of the road surface.

The travel control information generated here is transmitted from the narrow area automated driving server apparatus 50 to the automobile 2.

Thereafter, for example, when there is a possibility that the road to be traveled is slippery, the automobile 2 travels while reducing the speed as compared with the case where the automobile 2 is not in such a travel environment.

As described above, in the present embodiment, the narrow area automated driving server apparatus 50 provided to be communicable, with a small delay, with the base station 11 that wirelessly communicates with the automobile 2 executes the automated driving travel control of the automobile 2. Further, the road surface information updating server apparatus 5 generates map data including information indicating the state of the road surface on which the automobile 2 is slipping. Accordingly, using the map data updated with the map data including the information indicating the state of the road surface on which the automobile 2 is slipping, which is generated by the road surface information updating server apparatus 5, it is possible for the narrow area automated driving server apparatus 50 to execute the automated driving travel control of another automobile 2 that travels on the updated map data thereafter, in accordance with the state of the road surface that may be slippery. The assistance system 1 for the automobile 2 according to the present embodiment not only provides the automobile 2 with the service of the automated driving travel control of the automobile 2 with high quality repeatedly with a small delay, but further makes it possible to provide the service of the automated driving travel control, for example, to suppress the slip when the automobile 2 travels on the road surface that may be slippery.

In particular, in the present embodiment, the road surface information updating server apparatus 5 acquires, as the information on the traveling state of the automobile 2 acquired from the automobile 2 through the narrow area automated driving server apparatus 50, the operation information regarding the control device that is operated in the automobile 2 to suppress the slip of the automobile 2, analyzes the information on the outside-vehicle image of the section of the road surface in which the control device has operated, determines the state of the road surface on which the automobile 2 has slipped, generates, as the information usable in the service for the automobile 2, map data including the information indicating the state of the road surface of the section of the road surface in which the operation device has operated, transmits the generated map data to the narrow area automated driving server apparatus 50, and updates the map data recorded in the memory of the narrow area automated driving server apparatus 50. Thus, in the present embodiment, it is possible to update the map data of the narrow area automated driving server apparatus 50 that is usable for the automated driving travel control of the automobile 2 whose traveling is controllable by the narrow area automated driving server apparatus 50.

In the present embodiment, it is possible for the assistance system 1 for the automobile 2 not only to simply control the traveling of the automobile 2, but also to provide the service to make it difficult for the automobile 2 that is under the automated driving travel control to travel with an excessive slip by updating the map data to be used for the automated driving travel control to suppress the slip of the automobile 2. Moreover, in the present embodiment, because only the narrow area automated driving server apparatus 50 communicates with the automobile 2, even when the service that updates the map data to be used for the automated driving travel control is added, it is possible to maintain a high-quality service of the automated driving travel control of the automobile 2 repeatedly provided with a small delay.

The above-described embodiments are examples of preferred embodiments of the invention; however this example is a non-limiting example. Various modifications or changes can be made without departing from the scope of the invention.

In the above-described embodiments, the narrow area automated driving server apparatus 50 that directly communicates with the automobile 2 includes the base station communication device 55 that communicates with the automobile 2 and the first server communication device 54 that communicates with the service server apparatus 70.

In the narrow area automated driving server apparatus 50, the automated driving server CPU 52 prioritizes the control for the automated driving that communicates with the automobile 2 using the base station communication device 55 over the relay control that communicates with the service server apparatus 70 using the first server communication device 54.

In another example, the automated driving server CPU 52 may implement, in the automated driving server apparatus 50, a first processor that executes communication using the base station communication device 55 and a second processor that executes communication using the first server communication device 54. The first processor may be prioritized over the second processor. On this occasion, the first processor and the second processor may execute each of the communication processes using one common communication device.

DESCRIPTION OF REFERENCE NUMERALS

1: Assistance system, 2: Automobile (vehicle), 3: Carrier communication equipment, 4: Internet, 5: Road surface information updating server apparatus, 6: Vehicle malfunction estimation server apparatus, 11: Base station, 12: Local communication network (carrier communication network), 13: Carrier wide area communication network (carrier communication network), 15: Gateway device, 20: Control system, 21: Vehicle communication device, 22: Vehicle state determination device, 23: Own vehicle sensor control device, 24: Driving operation control device, 25: Travel control device, 26: Drive control device, 27: Steering control device, 28: Braking control device, 29: ABS control device, 30: Vehicle network, 50: Narrow area automated driving server apparatus, 51: Server GNSS receiver, 52: Automated driving server CPU, 53: Automated driving server memory, 54: First server communication device, 55: Base station communication device, 56: Automated driving server bus, 57: High-precision map data for service area, 58: Vehicle database, 60: Wide area automated driving server apparatus, 70: Service server apparatus, 71: Service server CPU, 72: Service server memory, 73: Second server communication device, 74: Service server bus, 75: Vehicle database, 76:

High-precision map data for overall region, 110: GNSS satellite, Tc: Automated driving travel control cycle of automobile, Ts: Automated driving travel control cycle of server, Tr: Remaining time

The invention claimed is:

1. An assistance system for a vehicle, the assistance system comprising:

an automated driving server apparatus adapted for automated driving travel control, the automated driving server apparatus being configured to repeatedly transmit and receive information to and from the vehicle; and a service server apparatus configured to transmit and receive information regarding the vehicle to and from the automated driving server apparatus, wherein the automated driving server apparatus comprises a vehicle-side communication device to be used for communication with the vehicle, a first server communication device to be used for communication with the service server apparatus, an automated driving server memory, and an automated driving controller, the automated driving controller of the automated driving server apparatus is configured to record, in the automated driving server memory, information acquired by the vehicle-side communication device repeatedly receiving from the vehicle, and execute control for automated driving that determines a traveling state of the vehicle, based on the information recorded in the automated driving server memory, generates information regarding the automated driving travel control, and repeatedly transmits the generated information through the vehicle-side communication device to the vehicle, and relay control that acquires, from the automated driving server memory, the information regarding the vehicle comprising the information acquired from the vehicle, and transmits the acquired information through the first server communication device to the service server apparatus, and the service server apparatus comprises a second server communication device to be used for communication with the automated driving server apparatus, and a service controller, the service controller of the service server apparatus is configured to generate information usable in a service for the vehicle, using the information regarding the vehicle acquired by transmission and reception to and from the automated driving server apparatus through the second server communication device without directly transmitting and receiving information to and from the vehicle.

2. The assistance system for the vehicle according to claim 1, wherein the automated driving controller is configured to execute the control for the automated driving that uses the vehicle-side communication device and is adapted for the automated driving travel control between the automated driving controller and the vehicle, taking priority over the relay control that uses the first server communication device and communicates with the service server apparatus.

3. The assistance system for the vehicle according to claim 2, wherein the automated driving controller is configured to execute execution management control separately from the control for the automated driving and the relay control to manage, in the automated driving server apparatus, execution of the control for the automated driving periodically executed for the automated driving travel control and execution of the relay control that transmits information to the service server apparatus, and manage, in the execution management control, the execution of the relay control to execute the relay control in a remaining period in which the control for the automated driving is not executed during an automated driving travel control cycle of the server for the control of the automated driving.

4. The assistance system for the vehicle according to claim 3, wherein the vehicle-side communication device of the automated driving server apparatus comprises a base station communication device configured to transmit and receive information to and from a base station that wirelessly communicates with the vehicle, the automated driving controller is configured to transmit, to the vehicle, the information regarding the automated driving travel control generated by the control for the automated driving, using the base station communication device, transmit, to the service server apparatus, the information regarding the vehicle to be transmitted by the relay control, using the first server communication device, and cause the information repeatedly transmitted by the vehicle to be receivable by the base station communication device even when the information regarding the vehicle to be transmitted by the relay control is being transmitted.

5. The assistance system for the vehicle according to claim 4, wherein the vehicle-side communication device of the automated driving server apparatus is configured to be disposed in the base station with which the vehicle wirelessly communicates, or is coupled to a carrier communication network that provides the base station, and the second server communication device of the service server apparatus is configured to be coupled to a communication network that is different from the carrier communication network, the communication network being coupled to the carrier communication network.

6. The assistance system for the vehicle according to claim 1, wherein the automated driving controller is configured to determine, when the vehicle-side communication device receives new information from the vehicle, whether or not emergency response information for the automated driving travel control performed by the automated driving server apparatus is comprised in the information that the vehicle-side communication device acquires from the vehicle, prior to the control for the automated driving for the automated driving travel control, transmit, when the emergency response information is comprised, an autonomous driving switching request that causes the vehicle to autonomously control traveling without being controlled by the automated driving server apparatus, through the vehicle-side communication device to the vehicle, and transmit information on the traveling state of the vehicle through the first server communication device to the service server apparatus by executing the relay control that communicates with the service server apparatus, and the service controller is configured to acquire, through the automated driving server apparatus, the information on the traveling state of the vehicle as the information regarding the vehicle to be acquired by the second server communication device, perform a comparison between the information on the traveling state of the vehicle to be acquired and information on a traveling state of another vehicle, and generate, as the information usable in the service for the vehicle, malfunction estimation information indicating that a malfunction in the vehicle has been estimated, when the service controller is unable to determine that the vehicle related to the information regarding the vehicle is traveling in a normal state, using determination based on a similarity level of pieces of information on traveling states of multiple vehicles according to the comparison.

7. The assistance system for the vehicle according to claim 6, wherein the service server apparatus comprises a memory that stores map data, the service controller is configured to acquire, through reception, information on a yaw rate indicating the traveling state of the vehicle detected by the vehicle as the information regarding the vehicle acquired through the automated driving server apparatus, perform a comparison between the information on the traveling state of the vehicle based on the yaw rate when the vehicle is traveling straight at a stable speed in the map data and one or more of information on a yaw rate of another vehicle traveling in the normal state and information on a yaw rate of another vehicle traveling with an abnormality in a suspension, and generate, as the information usable in the service for the vehicle, malfunction estimation information indicating that a malfunction in the suspension of the vehicle has been estimated, when the service controller is unable to determine that the vehicle is traveling in the normal state, using the determination based on a similarity level of pieces of information on waveforms of the yaw rates of multiple vehicles according to the comparison during traveling.

8. The assistance system for the vehicle according to claim 1, wherein the automated driving controller, is configured to, in the control for the automated driving for the automated driving travel control, execute a process of acquiring, from the vehicle, information on an outside-vehicle image captured by the vehicle in addition to information on the traveling state of the vehicle, and a process of generating information on the automated driving travel control adapted to control traveling of the vehicle that is traveling, based on the information on the traveling state acquired from the vehicle, and transmitting the generated information to the vehicle, and transmit the information on the outside-vehicle image together with the information on the traveling state of the vehicle to the service server apparatus by executing the control for the automated driving that generates information on the automated driving travel control, taking priority over the relay control that communicates with the service server apparatus, the service server apparatus comprises a memory that stores map data, and the service controller is configured to acquire, as the information regarding the vehicle acquired from the vehicle through the automated driving server apparatus, the information on the outside-vehicle image together with the information on the traveling state of the vehicle, determine, based on the information on the traveling state of the vehicle to be acquired, a slip state of the vehicle against a road surface, determine a state of the road surface on which the vehicle is slipping by analyzing the information on the outside-vehicle image to be acquired, and generate map data comprising the state of the road surface as information usable in the service for the vehicle and transmits the map data to the automated driving server apparatus.

9. The assistance system for the vehicle according to claim 8, wherein the service server apparatus is configured to acquire, as the information on the traveling state of the vehicle to be acquired from the vehicle through the automated driving server apparatus, operation information about a control device operated in the vehicle to suppress slipping of the vehicle, determine a state of the road surface on which the vehicle is slipping by analyzing the information on the outside-vehicle image of a section of the road surface in which the control device has operated, and update the map data recorded in the memory of the automated driving server apparatus by generating, as the information usable in the service for the vehicle, map data comprising information indicating the state of the road surface for the section of the road surface in which the control device has operated, and transmitting the generated map data to the automated driving server apparatus.

10. An assistance system for a vehicle, the assistance system comprising:

an automated driving server adapted for automated driving travel control, the automated driving server being configured to repeatedly transmit and receive first information to and from the vehicle; and a service server configured to transmit and receive second information regarding the vehicle to and from the automated driving server, wherein the automated driving server is configured to be used for communication with the vehicle and communication with the service server, and comprises an automated driving server memory and an automated driving processor communicably connected to the automated driving server memory, the automated driving processor of the automated driving server is configured to record, in the automated driving server memory, the first information repeatedly receiving from the vehicle by the communication with the vehicle, and execute control for automated driving that determines a traveling state of the vehicle, based on the first information recorded in the automated driving server memory, generates information regarding the automated driving travel control, and repeatedly transmits the generated information to the vehicle by the communication with the vehicle, and relay control that acquires, from the automated driving server memory, the second information regarding the vehicle comprising the first information acquired from the vehicle, and transmits the second information to the service server by the communication with the service server, and the service server is configured to be used for communication with the automated driving server, and comprises a service server memory and a service server processor communicably connected to the service server memory, the service server processor of the service server is configured to generate information usable in a service for the vehicle, using the second information regarding the vehicle acquired by transmission and reception to and from the automated driving server by the communication with the automated driving server, the second information being acquired by the service server processor without being directly transmitted and received to and from the vehicle.

* * * * *